(12) United States Patent
Werth

(10) Patent No.: US 8,055,599 B1
(45) Date of Patent: Nov. 8, 2011

(54) PATTERN RECOGNITION USING CYCLES OR TRACES IN AN ASSOCIATIVE PATTERN MEMORY (APM), VERTICAL SENSORS, AMPLITUDE SAMPLING, ADJACENT HASHES AND FUZZY HASHES

(76) Inventor: Larry J. Werth, Eagan, MN (US)

( * ) Notice: Subject to any disclaimer, the term of this patent is extended or adjusted under 35 U.S.C. 154(b) by 708 days.

(21) Appl. No.: 12/173,022

(22) Filed: Jul. 14, 2008

Related U.S. Application Data

(60) Provisional application No. 60/949,843, filed on Jul. 13, 2007.

(51) Int. Cl.
*G06F 17/00* (2006.01)
(52) U.S. Cl. ......................................... 706/45
(58) Field of Classification Search ............... 706/1–7, 706/12, 45, 62; 382/155–161, 181, 190; 707/1
See application file for complete search history.

(56) References Cited

U.S. PATENT DOCUMENTS

| | | | |
|---|---|---|---|
| 4,504,970 A | 3/1985 | Werth et al. | |
| 4,541,115 A | 9/1985 | Werth | |
| 4,550,431 A | 10/1985 | Werth et al. | |
| 4,551,850 A | 11/1985 | Werth et al. | |
| 5,473,707 A | 12/1995 | Werth | |
| 5,473,708 A | 12/1995 | Werth | |
| 5,875,264 A * | 2/1999 | Carlstrom | 382/181 |
| 7,299,282 B2 * | 11/2007 | Sarkissian et al. | 709/224 |
| 2005/0251509 A1 * | 11/2005 | Pontius | 707/3 |

* cited by examiner

*Primary Examiner* — David Vincent
(74) *Attorney, Agent, or Firm* — Charles A. Lemaire; Lemaire Patent Law Firm, P.L.L.C.

(57) ABSTRACT

Pattern recognition based on associative pattern memory (APM) and properties of cycles generated by finite cellular automata. APM addresses (e.g., positions in a two dimensional array) represent states. Cycles are repeating sequences of addresses. Each state is mapped to a "randomly" selected region within the input pattern. Each feature extracted from this region determines one of many next states. All next states (one for each feature type) and all sampled regions are assigned to each state randomly upon APM initialization. The process progresses from state to state, sampling regions of the pattern until the state-transition sequence repeats (generates a cycle). Each feature pattern is represented by one cycle, however different cycles can be derived from one pattern depending on the initial state. Some embodiments use a refractory period assuring a minimum cycle length, making it likely that any given pattern yields only one cycle independent of the initial state.

22 Claims, 20 Drawing Sheets

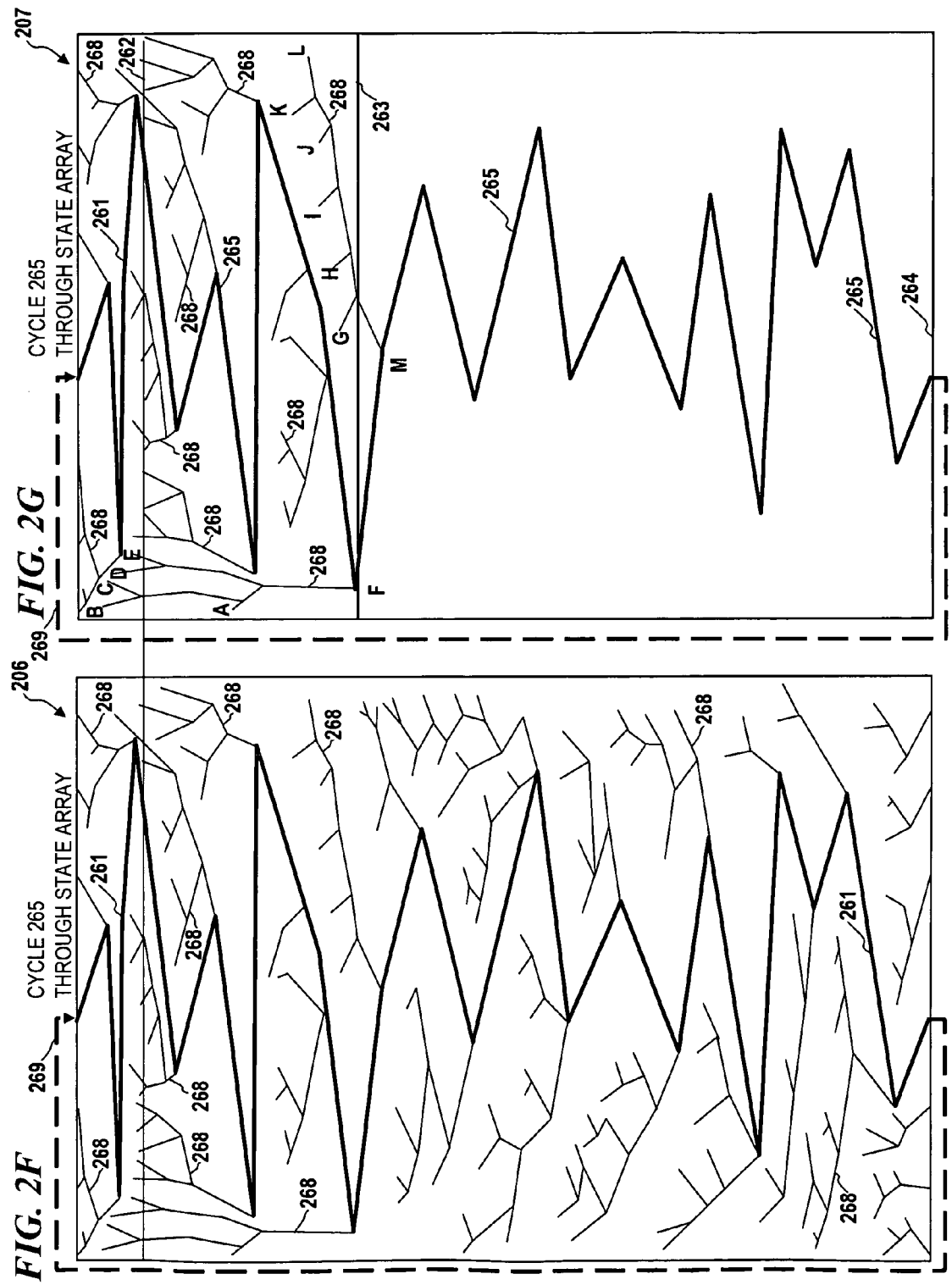

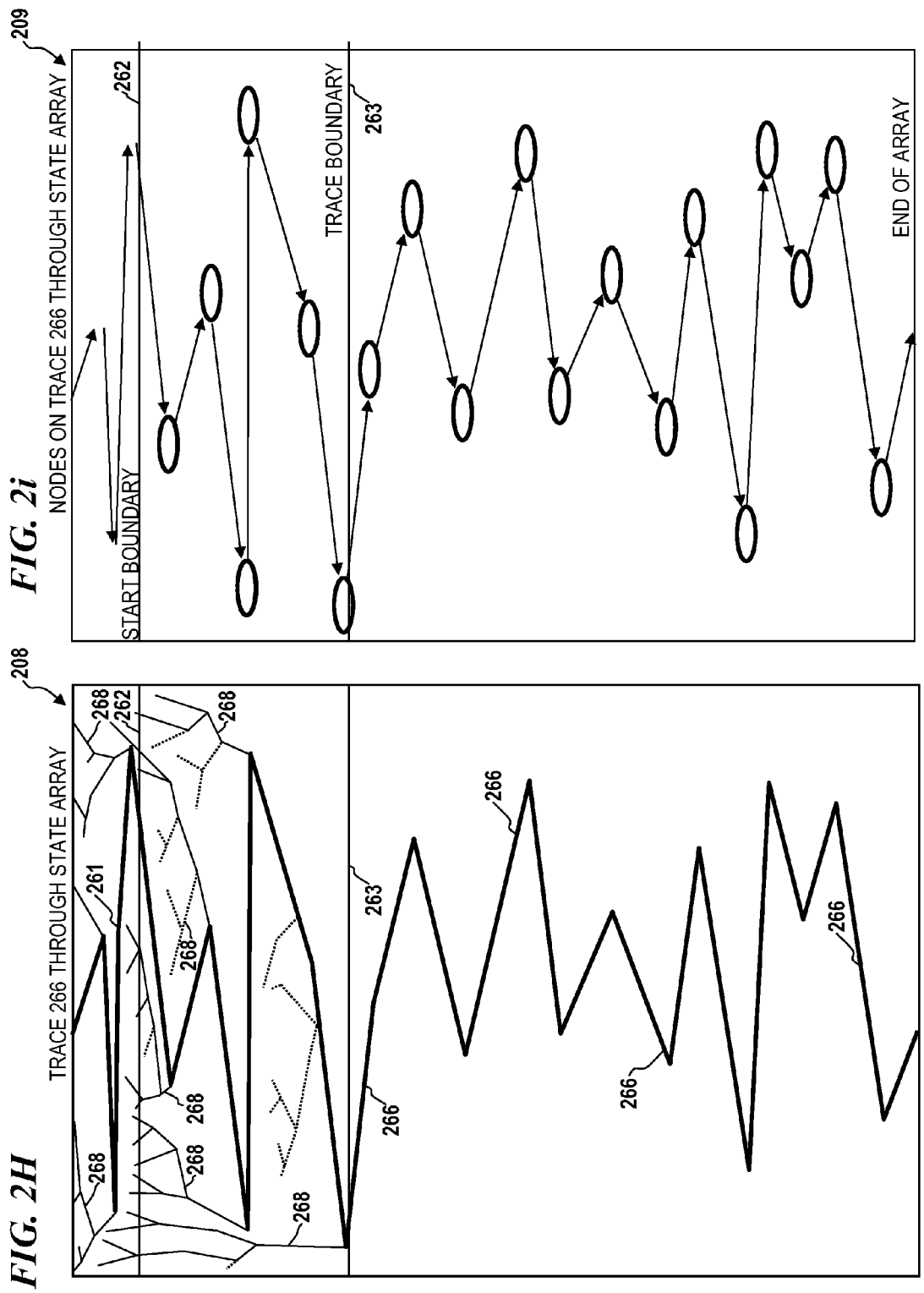

PATTERN RECOGNITION USING CYCLES OR TRACES IN AN ASSOCIATIVE PATTERN MEMORY (APM), VERTICAL SENSORS, AMPLITUDE SAMPLING, ADJACENT HASHES AND FUZZY HASHES

CROSS-REFERENCE TO RELATED APPLICATIONS

This application claims benefit under 35 U.S.C. §119(e) of U.S. Provisional Patent Application No. 60/949,843 filed on Jul. 13, 2007, titled "PATTERN RECOGNITION USING CYCLES IN AN ASSOCIATIVE PATTERN MEMORY (APM), VERTICAL SENSORS, AMPLITUDE SAMPLING AND FUZZY HASHES," which is incorporated herein by reference in its entirety. This application is also related to: U.S. Pat. No. 4,504,970 issued Mar. 12, 1985, to Larry J. Werth, titled "Training Controller for Pattern Processing System"; U.S. Pat. No. 4,541,115 issued Sep. 10, 1985, to Larry J. Werth, titled "Pattern Processing System"; U.S. Pat. No. 4,550,431 issued Oct. 29, 1985, to Larry J. Werth et al., titled "Address Sequencer for Pattern Processing System"; U.S. Pat. No. 4,551,850 issued Nov. 5, 1985, to Larry J. Werth et al., titled "Response Detector for Pattern Processing System"; U.S. Pat. No. 5,473,707 issued Dec. 5, 1995, to Larry J. Werth, titled "Pattern Processing System with Weighted Training Codes"; and U.S. Pat. No. 5,473,708 issued Dec. 5, 1995, to Larry J. Werth, titled "Pattern Processing System Using Minimum Length Address Loops"; each of which is incorporated herein by reference in its entirety.

FIELD OF INVENTION

This invention relates to the field of computerized pattern recognition and more particularly to detecting repeating paths through an associative pattern memory (called cycles) using vertical sensors, amplitude sampling and/or fuzzy hashes.

BACKGROUND OF THE INVENTION

There has been interest in technologies for computer pattern recognition. For example, in *Mathematical Neurobiology* by J. S. Griffith (Academic Press, New York, 1971), models of neural networks are described. One model was a randomly connected network of neurons. Each neuron was either active (firing) or inactive. The total status of all the neurons defined the state of activity of the network. Since the neurons are connected to other neurons, any given state of activity would generate a next state of activity. Although the neuron connections were initially assigned at random, the connections remain fixed as the network moves from one state to the next. The total number of possible states is finite. Given any initial state, the network will step from state to state and ultimately hit a state that occurred previously. Since the network connections are fixed (deterministic), the network will continue to cycle through the same set of states. Given any arbitrary initial state the network always terminate in a cycle.

The above mentioned U.S. Pat. Nos. 4,504,970, 4,541,115, 4,550,431, 4,551,850, 5,473,707, and 5,473,708 describe various pattern recognition methods including using Associative Pattern Memory (APM) techniques to detect patterns.

Finite automata are a type of cellular automata that are the main focus of *A New Kind of Science* by Stephen Wolfram (Wolfram Media, Inc., 2002). In his book and other research papers, cycles are analyzed in depth.

There is a need for improved systems and methods for pattern recognition.

BRIEF SUMMARY OF THE INVENTION

This invention defines new algorithms that enable developers and researchers in pattern recognition to create new and enhanced products for applications such as content-based image retrieval, content-addressable storage, data mining, signal processing, visual guidance, and pattern processors and, many others. It is unique because it offers both fuzzy recognition (recognizes similar patterns) and high-speed associative recall of learned patterns (no searching for matches). It is not the application solution it is the algorithm that makes many pattern recognition solutions possible. Its uniqueness is attributed to its biological origin as the neural code for pattern recognition.

BRIEF DESCRIPTION OF THE DRAWINGS

FIG. 2F is a diagram of state array 206, according to some embodiments of the invention.

FIG. 2G is a diagram of state array 207, according to some embodiments of the invention.

FIG. 2H is a diagram of state array 208, according to some embodiments of the invention.

FIG. 2i is a diagram of state array 209, according to some embodiments of the invention.

DETAILED DESCRIPTION OF THE INVENTION

Figure 1A:
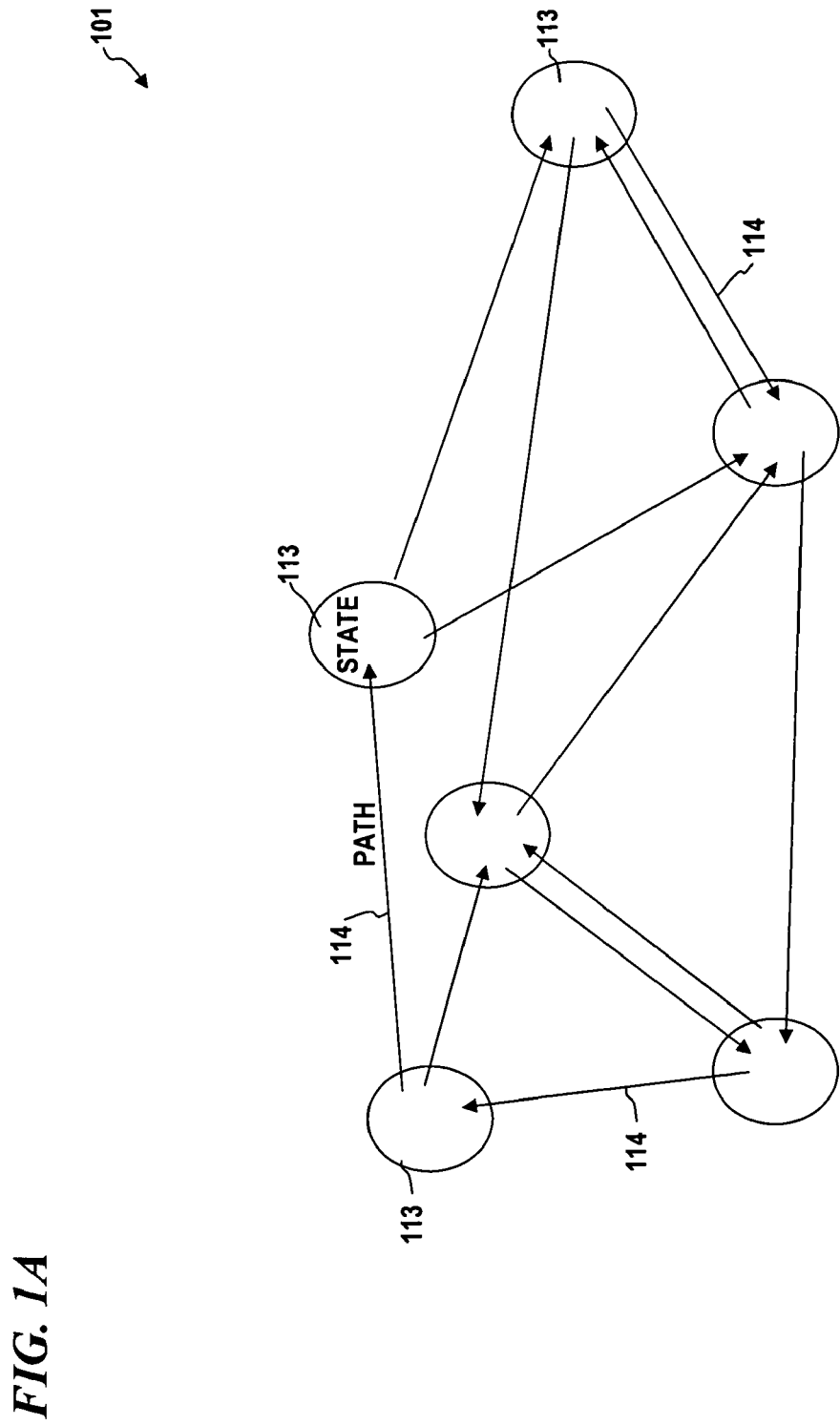
FIG. 1A shows a directed graph representing some embodiments of the invention.

Although the following detailed description contains many specifics for the purpose of illustration, a person of ordinary skill in the art will appreciate that many variations and alterations to the following details are within the scope of the invention. Accordingly, the following preferred embodiments of the invention are set forth without any loss of generality to, and without imposing limitations upon the claimed invention.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

The leading digit(s) of reference numbers appearing in the Figures generally corresponds to the Figure number in which that component is first introduced, such that the same reference number is used throughout to refer to an identical component which appears in multiple Figures. Signals and connections may be referred to by the same reference number or label, and the actual meaning will be clear from its use in the context of the description.

The following Table 1 includes data from J. S. Griffith's book:

TABLE 1

| Total # States | Expected # of Terminal States | Expected Number of Cycles | Expected # of Transition States | Fraction Terminal States |
|---|---|---|---|---|
| 100 | 12 | 3 | 7 | 0.12 |
| 1,000 | 40 | 4 | 20 | 0.04 |
| 10,000 | 125 | 5 | 63 | 0.0125 |
| 100,000 | 396 | 6 | 198 | 0.00396 |
| 1,000,000 | 1,253 | 8 | 627 | 0.001253 |
| 10,000,000 | 3,963 | 9 | 1982 | 0.000396 |

TABLE 1-continued

| Total # States | Expected # of Terminal States | Expected Number of Cycles | Expected # of Transition States | Fraction Terminal States |
|---|---|---|---|---|
| 100,000,000 | 12,533 | 10 | 6267 | 0.0001253 |
| 1,000,000,000 | 39,632 | 11 | 19817 | 0.0000396 |

Note that, in some embodiments:

Given any initial state, there will be a certain number of transition states before a path converges to a cycle or a trace.

Column 4 in the table above describes the expected number of such transition states.

Column 2 describes the expected number of states that will be in a cycle (terminal states).

Column 3 describes the expected number of different cycles.

Column 5 describes the fraction of total states that will be in cycles.

One significance of Table 1 is that, given any arbitrary initial state, the network will always converge to a small fraction of terminal states and therefore provides a form of data reduction or representation. For example, given 1 million possible states, only 1,253 will be in terminal states (i.e., a looping path, cycle or trace).

For example, if each state was mapped to a region of an input pattern and the next state was dependent on the sample value at that point each different input pattern would create a different random network for which the same statistics apply as in the table above. A random next state could still be assigned to each state for each different sample value. This data reduction or representation therefore can provide an enormous capacity to distinguish and represent different patterns. Further, if the sequence of states in the terminal states were also considered in the representation, the capacity to distinguish and represent patterns increases even more dramatically.

A technology that uses this concept of cycles to represent patterns formed the basis of the following four patents. This invention provides improvements over those patents. The four patents described: the APM system (Pattern Processing System 4,541,115), the method of sequencing from state to state (Address Sequencer for Pattern Processing System 4,550,431), the method of training a identity or a pattern (Training Controller for Pattern Processing System 4,504,970), and the method to detect the identity of a pattern (Response Detector for Pattern Processing System 4,551,850).

The hardware implementation described in the prior patents makes their implementation more complex. In some embodiments, various embodiments of the current invention, described below, are implemented in computer memory using software.

One Implementation of Concept of the Present Invention

The concept of states and state transitions does not have to be about neural networks. State transition diagrams are used in many disciplines. Probably the most general discipline is finite automata. It can be illustrated as a directed graph shown below:

In FIG. 1A, each state 113 is represented as a circle and the transitions or path 114 are represented as arrows. In the embodiment shown, each state has two possible next states, which, in this example, could correspond to a sample value of 1 or 0 from a specific region of a binary input pattern. Depending upon the discipline, cycles are called attractors, oscillations, limit cycles, or reverberations. Reverberations are cycles observed in real biological networks.

Finite automata are a type of cellular automata that are the main focus of *A New Kind of Science* by Stephen Wolfram (Wolfram Media, Inc., 2002). In his book and other research papers, cycles are analyzed in depth.

In some embodiments, a state is simply a memory address in an array (e.g., a state array or a vertical-sensor array). An array of 1 million represents 1 million states. As used herein, a state and a memory address used to access data in the state array are equivalent.

Figure 1B:
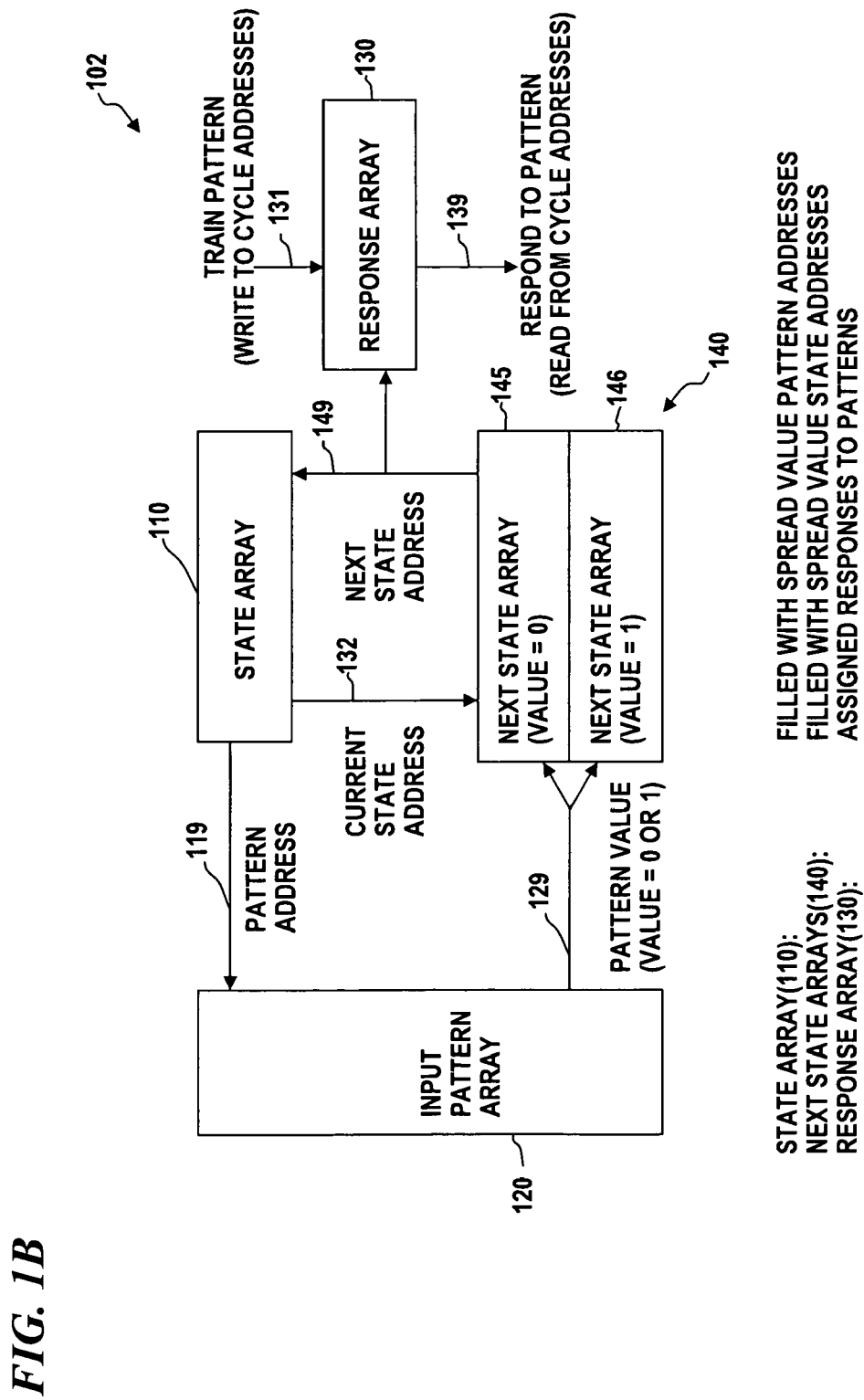
FIG. 1B is a conceptual block diagram of an unlimited jump pattern-recognition system 100, according to some embodiments of the invention, which can be implemented in software and/or hardware.

In some embodiments, as shown in FIG. 1B, the state array 110, next state arrays 145 and 146, and response array 130 have the same number of addresses and share a common state address which can be either the current state address 132 or the next-state address 149. In some embodiments, the arrays are combined and thus implemented as a single four-dimensional array (i.e., an array in which each location stores four data values: a state-array value, a next-state-array value for pattern value=0, a next-state-array value for pattern value=1, and a response-array value (if there is one) for a trained pattern that has a path that encounters that address). In some embodiments, the input pattern value 129 (the data from a location in input-pattern array 120 that is addressed by the pattern address 119 from the state array 110) determines the next state address 149. In some embodiments, the input pattern is represented by the input pattern array 120 as binary-sample values and therefore there is a next-state array (145 and 146) for each of the (in this case, two) possible input-pattern values (the values at the locations in the input pattern that are sampled by the path). In some other embodiments, the present invention uses methods to handle multiple (i.e., more than two) pattern values that include multiple next-state-address arrays such as shown in FIG. 1C, or methods that use techniques other than assigning each separate value an array (such as the normalizing method shown in FIG. 3), however, this is a diagram to show one implementation.

In order to spread out the various paths that different input patterns generate, a set of spread values (e.g., random numbers, pseudo-random values, or values derived from, for example, selected digits or sets of digits from transcendental numbers such as pi, e, square roots of prime numbers, or the like, or any other set of numbers that will help to spread out the paths and/or the hash(es) derived from the hash(es) obtained from a given input pattern) are used to initialize various arrays in the APM processor. These types of numbers are herein called "spread numbers" and are typically generated by one of the above manners (e.g., a random-number generator, or by sampling various digits of a transcendental number). In some embodiments, the state array is initialized by loading into it spread numbers (e.g., pseudo-random) that each point to one of the addresses in the input array (i.e., these numbers tell the APM processor which input value to sample at each state of the state array), and the next-state-increment array is initialized by loading into it spread numbers (e.g., pseudo-random) that each indicate the size of the increment for the next state address (when added to the current-state address, the sum points to one of the addresses in the state array (i.e., these numbers tell the APM processor which address in the state array has the next input value to sample). By using random numbers or any other suitable set of numbers (as described above), the sequence and set of input pattern values that are sampled are spread out (so different hashes or different paths result from different input patterns, and such that the same or similar hashes or paths are generated from the same or similar input patterns.

In some embodiments, in the training mode, a succession of training input patterns are used, for example each training input pattern is presented and continuously sampled in a random or pseudo-random (i.e., spreading) manner. A cycle will be generated or a trace will be detected for each training input pattern at which time the desired response (e.g., a pattern identifier that the programmer wants the system to output) for that pattern can be written into the response array 130 at the addresses in the cycle or trace. In response mode (also called recognition mode) the content of the response array 130 is read once a cycle or trace is identified. If the to-be-recognized input pattern is the same as (or substantially similar to) one previously trained, then the cycle addresses will contain the desired responses (the pattern identifiers stored into the response array during the prior training mode) for that pattern. For example, if the pattern input was an image of the character "A" the trained response could be the ASCII code for "A" or other suitable identifier for that pattern. In this case the intended response would be for pattern recognition.

Figure 1C:
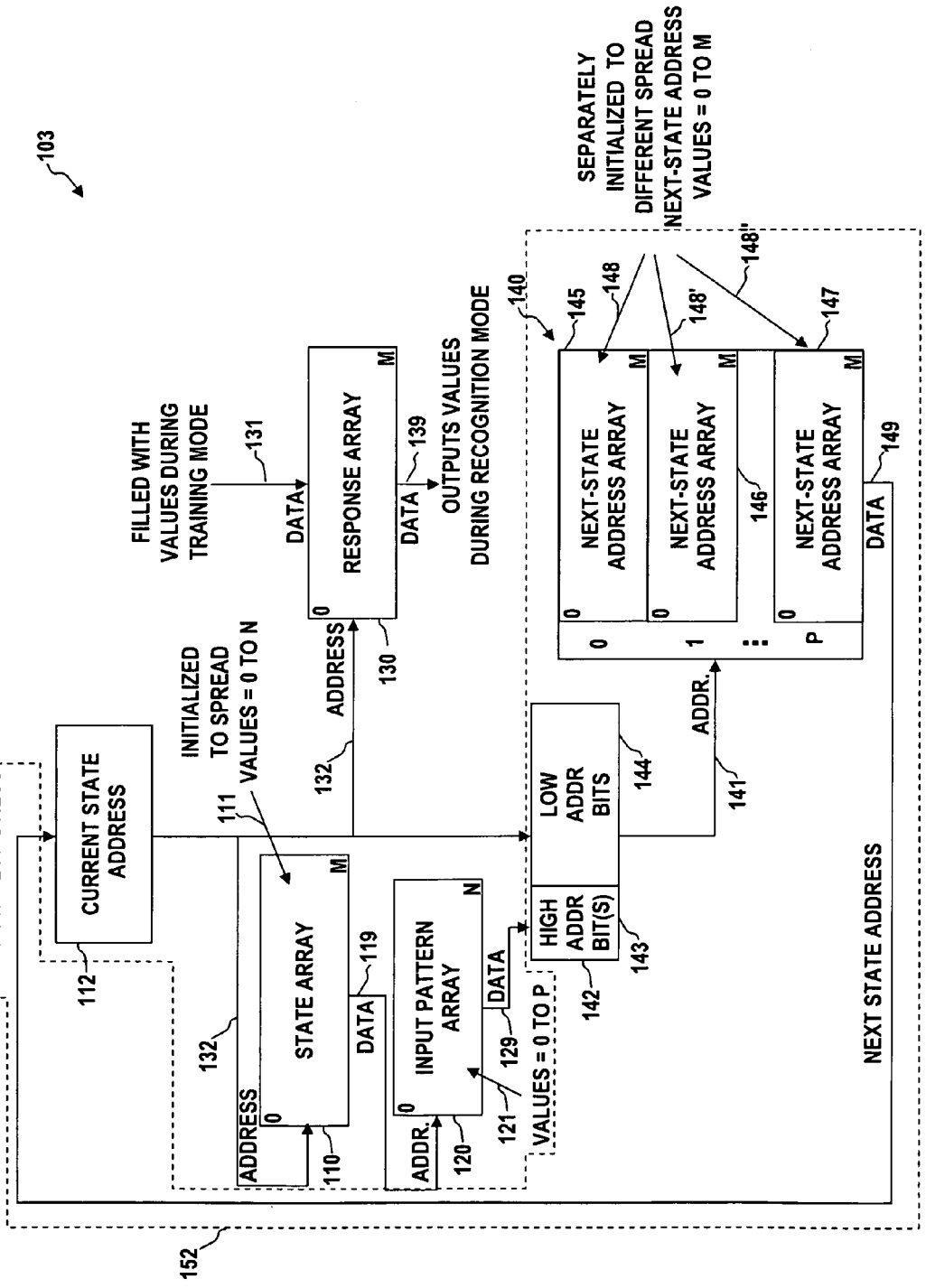
FIG. 1C is a block diagram of an unlimited jump pattern-recognition system 100, according to some embodiments of the invention, which can be implemented in software and/or hardware.

FIG. 1C is a block diagram of an unlimited jump pattern-recognition (UJPR) system 100, according to some embodiments of the invention, which can be implemented in software and/or hardware. Since the next-state-address arrays for each input-pattern-array value forms the entire address for the state array, the length of the jump from any given state array address to the next state array address is unlimited and can be considered to be forward (to a higher address) or backward (to a lower address than the current address). In some embodiments, this embodiment does not readily permit forcing a minimum cycle length. In some embodiments, UJPR system 103 includes an input pattern array 120 (having N+1 locations that are addressed as 0 to N). It also uses a state array 110 (having M+1 locations that are addressed as 0 to M) that is initialized by filling each location with a random number (or other spread number) between 0 and N (denoted RANDOM (0:N)), and one or more next-state address arrays 145, 146 and/or 147. In operation, next-state-address unit 152 is used to read data 119 from the state array 110 and is used as an address into the input pattern array 120; the data 129 read from the input pattern array (IPA) 120 is used as the upper-order address bits 143 and the current state address 112 is used for the lower-order address bits 144, wherein address register 142 (containing the upper bits 143 and lower bits 144 together) outputs an address 141 into the next-state address array (NSAA) 140 (which, in some embodiments, is divided into individual next-state address arrays 145, 146 and/or 147, wherein the data value from input pattern array 120 selects which one of the next-state address arrays 145, 146 and/or 147 to use to obtain the next address for the state array).

In initialization mode, UJPR system 103 is "initialized" by loading each location of state array 110 with a random number between 0 and N (denoted RANDOM(0:N)). In some embodiments, each location in each of the next-state address arrays 145, 146 and/or 147 is initialized with a random number between 0 and M (allowing branches or state jumps to any state location (0 to M) in state array 110). The data 149 read from the NSAA 140 is loaded into current state address register 112 which then provides that address as the next current-state address 132 into the state array 110.

In training mode, UJPR system 103 is "trained" by loading a known sample pattern into IPA 120, starting at an arbitrary address in the state array 110 (such as address zero or any other address). The value from that starting state is read and used as the address into the IPA 120 to obtain a sample value, which is used for determining the next state address, which is then sampled and the process is repeated until at some point, it is detected that one of the states is visited again. From that point on, the branching pattern will repeat, since the data in input pattern array 120, state array 110, and next-state address arrays 140 is fixed and thus will yield the same branches. This condition of repeating branches through the state array 110 is called a cycle. Once a cycle is detected, the set of addresses of that cycle (which can be obtained by again repeating the cycle) is used as address inputs 132 to response array 130, and data 131 identifying the particular training pattern is written to each of the cycle addresses in response array 130. This process is then repeated for as many known sample patterns as desired (in some embodiments, a plurality of different input patterns are detected as the same pertinent data and identical response data is loaded in all locations of the cycles detected for those input data, while in other embodiments, each training pattern is designated to be recognized with a different response, so each cycle is loaded with different response data).

In recognition mode, UJPR system 103 is used to analyze a set of input data (such as an image, handwriting, audio, video, seismic data or any other data) by loading at least a part of the data (an input sample pattern) into IPA 120, starting at an arbitrary address in the state array 110 (such as address zero or any other address). The value from that starting state is read and used as the address into the IPA 120 to obtain a sample value, which is used for determining the next state address, which is then sampled and the process is repeated until at some point, it is detected that one of the states is visited again. From that point on, the branching pattern will repeat, since the data in input pattern array 120, state array 110, and next-state address arrays 140 is fixed and thus will yield the same branches. Once a cycle is detected for the unknown input data, any one of the set of addresses of that cycle is used as address input 132 to response array 130, and data 139 having the response loaded during training identifying the particular training pattern is read from response array 130, and that response is the recognized pattern (the output of the analysis).

As used herein, a state array 110 is an array of data, wherein the data at each location in the state array 110 specifies one portion (a location) of the input pattern array that will be sampled and, with the next-state address array(s), specifies the order in which those portions are sampled. In some embodiments, the state array 110 is initially filled with random (or pseudo random) numbers between 1 and the number of entries (N) in the input pattern array 120. In some embodiments, each entry in the state array 110 specifies one address in the input pattern array (IPA) 120, and in operation (training mode or recognition mode, respectively), the pattern recognition system will read the value from that address in the IPA 120 (which has been loaded with data to be trained or analyzed, respectively) and use the value from there to determine the next address (state) in the state array 110.

As used herein, a "cycle" is the pattern of states or the path (i.e., the sequence of addresses used to address locations in the state array) that is obtained by processing a given input pattern using an APM-processing system as provided by the present invention with a given state array pattern (i.e., the data loaded into the state array) and a given next-state-address pattern (the data or calculations used to obtain the next address used to obtain data from the state array), wherein regardless of the starting state, the branching pattern (given that increments from addresses near the end of the array branch to addresses at the beginning of the array (an end-around branch)) will eventually end up in a loop-branching path or pattern (i.e., herein called the cycle). Once the path is discovered to use an address previously used along this path, it is said that the cycle has been detected.

As used herein, a "trace" is the pattern of states or the path (i.e., the sequence of addresses used to address locations in the state array) that is obtained by processing a given input pattern using an APM-processing system as provided by the present invention with a given state-array pattern and a given next-state-address pattern, wherein as long as the starting state is sufficiently close to the start of the state array, the sequence of addresses will have converged (to a given certainty or probability) to the same path as would be detected as a cycle using the method of the previous paragraph. As described below, a trace boundary can be defined that establishes to a given probability, that the path is following the same address sequence as would be followed by a cycle when following a path. The portion of the path after the trace boundary is called the trace. The term "path" is herein used as the generic term for the sequence of addresses that define either a cycle or a trace.

PATTERN PROCESSING SYSTEM USING MINIMUM LENGTH ADDRESS LOOPS (see U.S. Pat. No. 5,473,708, which is incorporated herein by reference)

The systems (FIG. 1B and FIG. 1C) described above have limitations which were addressed in U.S. Pat. No. 5,473,708. As detailed in Table 1 above, most likely, more than one cycle can occur depending upon the initial state. This means that for any given pattern all the cycles that could occur for that pattern need to be trained. Also, since the next state for each state is randomly selected, the next state could happen to be the same as the current state (a cycle of length l) and only one sample point and only one response address would be accessed. The response would simply repeat whatever was stored at that response address and be useless.

U.S. Pat. No. 5,473,708 was critical to the success of some embodiments of the concept. A method was implemented that would control the minimum length of any cycles that could occur. Once a state occurs it is prevented from reoccurring for a minimum number of subsequent states. This is referred to this as a refractory period.

Implementing a refractory period offers several advantages:

The input pattern will be sampled at least some minimum number of times.

Transition states have a greater tendency to converge back to the single cycle given small variations in the input pattern allowing for fuzzy recognition.

With an appropriate minimum cycle length there is a high probability that there will only be one cycle for a given input pattern—not multiple cycles.

Consider an example with an APM having one-million states and a minimum cycle length of at least 3700 states. If there were more than one cycle, the second cycle would also have to be 3700 or longer and the two cycles could not have a common address. Given that any cycle is a random selection of addresses, it is highly improbable that there would exist a second cycle with 3700 randomly selected points that would not overlap with the first cycle.

The probability of not selecting one of the 3700 points out of 1 million is:

996,300/1,000,000 or 0.9963.

The probability of not selecting 1 of the 3700 after 3700 tries is:

$(0.9963)^{3700}$ or 0.0000011 or one in a million.

Therefore, the selection of a minimum cycle length can essentially assure that there will be only one cycle for any given input pattern. A cycle is simply a random set of addresses in memory that identify themselves by being accessed repeatedly. As a result, any input pattern can be represented by a random set of addresses in memory.

There are different ways to implement a minimum cycle length. One embodiment involves changing the content of the next state arrays and adding a counter to create the next state.

Rather than have the next state arrays contain the actual addresses of the state array, they contain random numbers within a specified range that are added to a counter. The count value becomes the next state address and random addresses are generated incrementally. Once the counter exceeds the number of states it rolls over to the beginning of the count just like a typical binary counter. An identical count (next state) cannot occur until after the count rolls over. With a state memory size of one million and a minimum cycle of about 3700 the next state arrays should contain random numbers between 1 and 540 (not zero, since that would result in a cycle of length 1). This means that the average increment of the counter would be 540 divided by 2, which is 270, and the average number of steps (states) before it rolls over at 1 million would be 1,000,000 divided by 270, which is 3,703. Therefore the average cycle will be very close to 3700 and only one cycle will exist for each pattern.

Figure 2A:
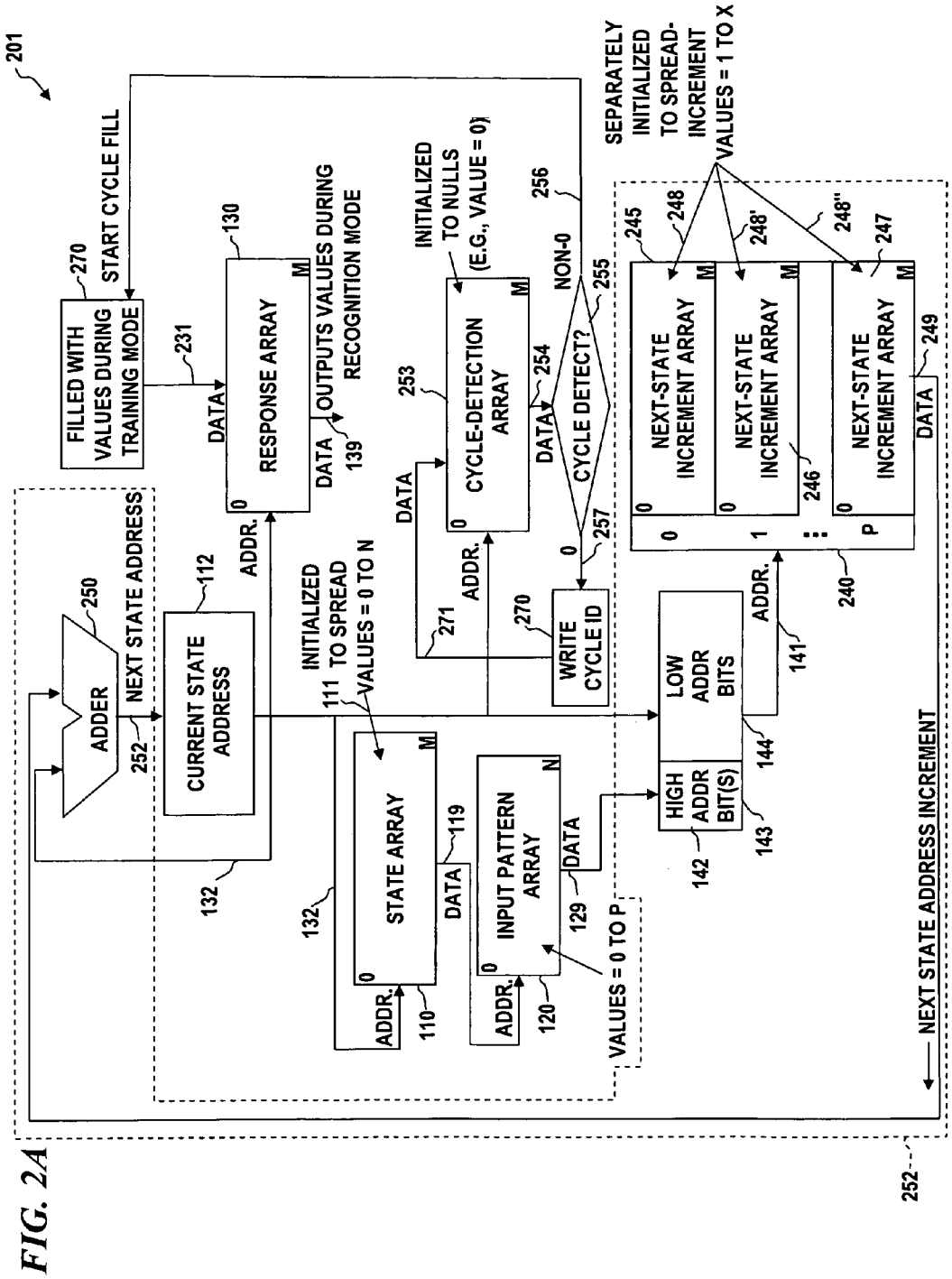
FIG. 2A is a block diagram of a limited jump pattern-recognition system 201, according to some embodiments of the invention, which can be implemented in software and/or hardware.

FIG. 2A is a block diagram of a limited jump pattern-recognition (LJPR) system 201, according to some embodiments of the invention, which can be implemented in software and/or hardware. LJPR system 201 implements a different mechanism for limiting a minimum number of states in every cycle. In some embodiments, those elements having reference numbers between 100 and 199 are identical to like-numbered elements in UJPR system 103 of FIG. 1C, described above. One feature of LJPR system 200 is that the current state address is determined by using next-state-address unit 252 and adding a next-state increment to the current state address, and limiting the step size of the increment to a value less than a selected value X. Thus, next-state increment array (NSIA) 240 (which, in some embodiments, is divided into individual next-state address arrays 245, 246 and/or 247, wherein the data value from input pattern array 120 selects which one of the next-state increment arrays 245, 246 and/or 247 to use to obtain the next address for the state array, and the current state address 132 is used for the low address bits of the address of NSIA 240).

In initialization mode, LJPR system 201 is initialized by loading each location of state array 110 with a random number between 0 and N (denoted RANDOM(0:N)). In some embodiments, each location in next-state increment array 245 is initialized with data 248 each location having a random number between 1 and X, each location in next-state increment array 246 is initialized with data 248' each location having a random number between 1 and X, and each location in next-state increment array 247 is initialized with data 248" each location having a random number between 1 and X (allowing branches or state jumps to a limited number of forward-direction states), thus forcing every cycle to have an end-around jump from a state near the end of state array 110 (within X locations of the end) to a state near the beginning of state array 110 (within X locations of the beginning) The data 249 read from the NSIA 240 is added to the address from current state address register 112 and the resultant sum is loaded into current state address register 112 which then provides that address as the next current-state address 132 into the state array 110.

Another aspect of the present invention shown in FIG. 2A (which can also be combined with any of the other embodiments described herein) is the cycle-detection array 253. In some embodiments, cycle-detection array 253 is initialized (before each training mode operation and before each recognition-mode operation) by loading all locations with a null value (such as zero (0)). As each state is executed, the address 132 is used as an address into cycle-detection array 253, and the value 254 from that address is read as data from the cycle-detection array 253 and compared by checking unit 255 against the null value (e.g., checking if it is zero), and if null is detected 257, a non-null value 271 is written as data to that address in cycle-detection array 253 by write-cycle-ID controller 270. Once the operation has proceeded sufficiently, a non-null value will eventually be read from the location in cycle-detection array 253 (i.e., from an address in cycle-detection array 253 that was visited and filled with the non-null value earlier in this operation) and the non-null result 256 will indicate that a cycle has been detected. If in training mode, this starts a cycle fill by unit 270, which will fill every location in response array 130 that corresponds to a cycle address with a response value (thus training the response array with a response to the cycle caused by that pattern). Thus if an image of an "a" If in recognition mode, then the non-null cycle detect will cause one or more of the cycle addresses to be read out from the response array 130 providing data 139 that identifies the recognized pattern in the input pattern data. In some embodiments, assuming that the patterns to be recognized are sufficiently spread out, a single value is read out from the response array 130 providing data 139 that identifies the recognized pattern. In other embodiments, a plurality of values along the path or cycle of the unknown image are read out and if a majority (more than 50%) or if no response has a majority, the response having the largest count of that response value, identifies the recognized pattern.

In some other embodiments, an alternative cycle-detection method is used. In the alternative cycle-detection method, the cycle detection array is initialized at start-up by loading all address locations with a null value such as zero (0). Rather than zeroing out the cycle detection array every time a new cycle is to be generated, some embodiments just store a new incremented count at that location for each new cycle. For example, in some embodiments, the cycle-detection array 253 is initially initialized with zeros. The first use, i.e., identifying the first cycle, will fill in the value "1" into each cycle location (every one of the addresses to which the state array was traversed). Identifying the second cycle will test whether a "2" already exists at each location traversed along the second cycle—if not a "2" will be filled in—but if so, the detection of the cycle is established. Thus, if later the 55,306$^{th}$ cycle was just generated (each location of that cycle was filled by a "55306") and detected (by revisiting a location and discovering a "55306" at that location), then detection of that 55,306$^{th}$ cycle is established. For the next following cycle, the next number written to the cycle-detection array 253 (to identify the next 55,307$^{th}$ cycle) would be "55307". When the current cycle's number is read from an address during a cycle-detect operation, a new cycle has been detected. This is simply for speed (avoiding having to fill the cycle-detection array 253 with null values save time). When the incremented count value rolls over to zero (after 4,294,967,295 for a 32-bit number), the system re-initializes the entire cycle-detection array 253 to the null value of zero.

Figure 2B:
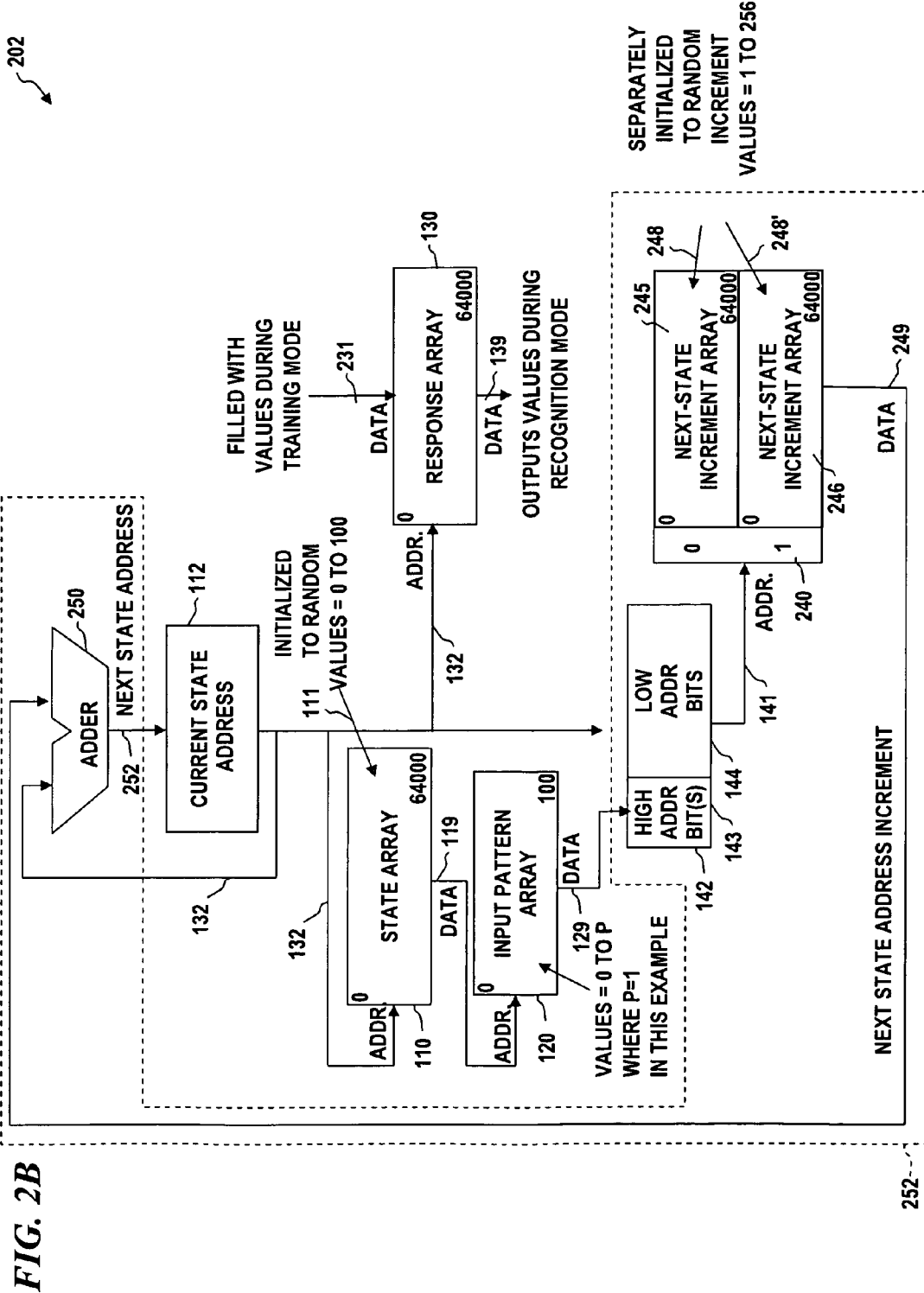
FIG. 2B is a block diagram of pattern-recognition system 202 with exemplary sized state array (e.g., 64000 states), input pattern array, and step size.

FIG. 2B is a block diagram of pattern-recognition system 202 with exemplary sized state array (e.g., 64000 states in this example; in other embodiments, smaller arrays are used, or much larger arrays are used since memory prices and their energy consumption have dramatically dropped), as well as an exemplary sized input pattern array, and step size. In this example, the state array size is 64001 (i.e., addresses 0 to M=64000), input pattern array size is 101 (i.e., addresses 0 to N=100), and step size is a maximum of X=256 (i.e., random numbers between 1 and 256). In some embodiments, the input pattern array is allowed to only have a binary 0 or 1, thus only two next-state increment arrays 245 and 246 are used. Thus, response array 130 also has 64001 locations, and each next-state increment array 245 and 246 has 64001 locations each having random values between 1 and 256. The binary bit value read from IPA 120 provides the high-order bit 143 of the address into NSIA 240.

Figure 2C:
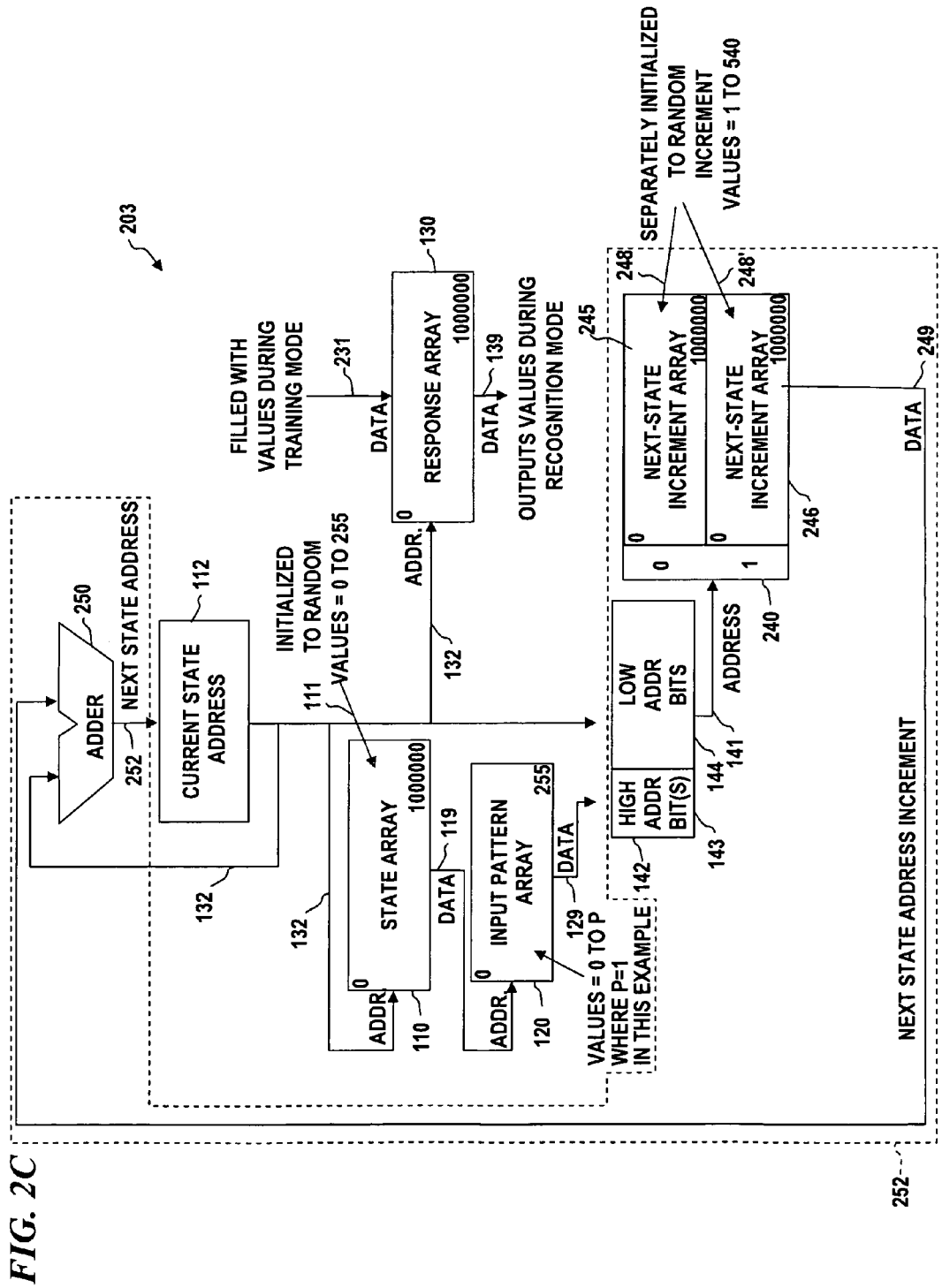
FIG. 2C is a block diagram of pattern-recognition system 203 with different exemplary sized state array (e.g., 1,000,000 states), input pattern array, and step size.

FIG. 2C is a block diagram of pattern-recognition system 203 with different exemplary sized state array (e.g., 1,000,000 states), input pattern array, and step size. In this example, the state array size is 1,000,001 (i.e., addresses 0 to 1,000,000), input pattern array size is 256 (i.e., addresses 0 to 255), and step size is a maximum of 540 (i.e., random numbers between 1 and 540). In some embodiments, the input pattern array is allowed to only have a binary 0 or 1, thus only two next-state increment arrays 245 and 246 are used. Thus, response array 130 also has 1,000,001 locations, and each next-state increment array 245 and 246 has 1,000,001 locations each having random values between 1 and 540. The binary bit value read from IPA 120 provides the high-order bit 143 of the address into NSIA 240. As noted above, with a state memory size of one million and a minimum cycle of about 3700 the next state arrays should contain random numbers between 1 and 540. This means that the average increment of the counter would be 540 divided by 2, which equals 270, and the average number of steps (states) before it rolls over at 1 million would be 1,000,000 divided by 270, which equals 3,703. Therefore the average cycle will be very close to 3700 and only one cycle will exist for each pattern.

Figure 2E:
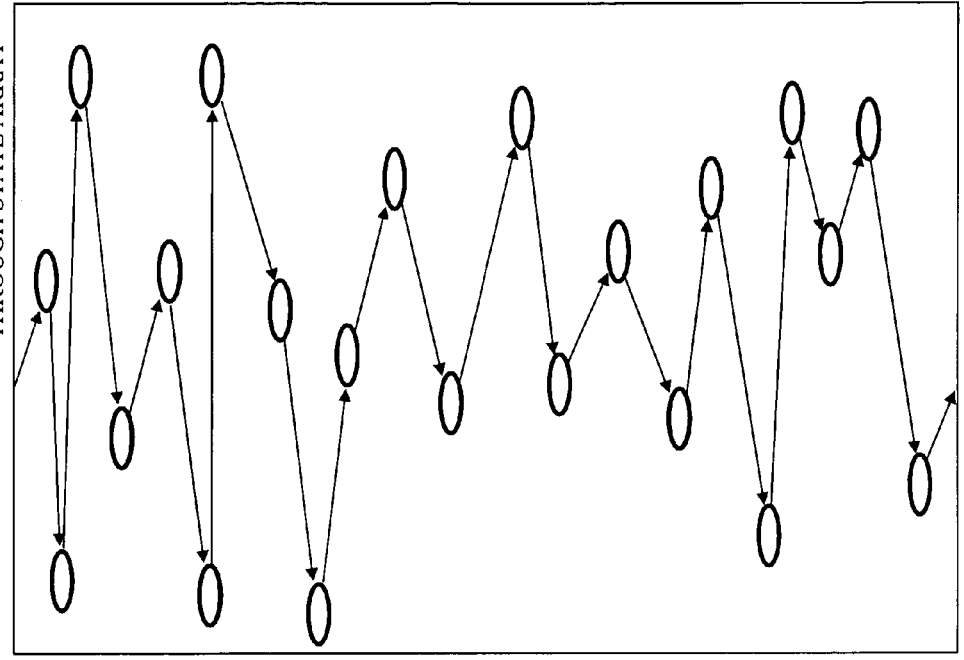
FIG. 2E is a diagram of state array 205, according to some embodiments of the invention.
Figure 2D:
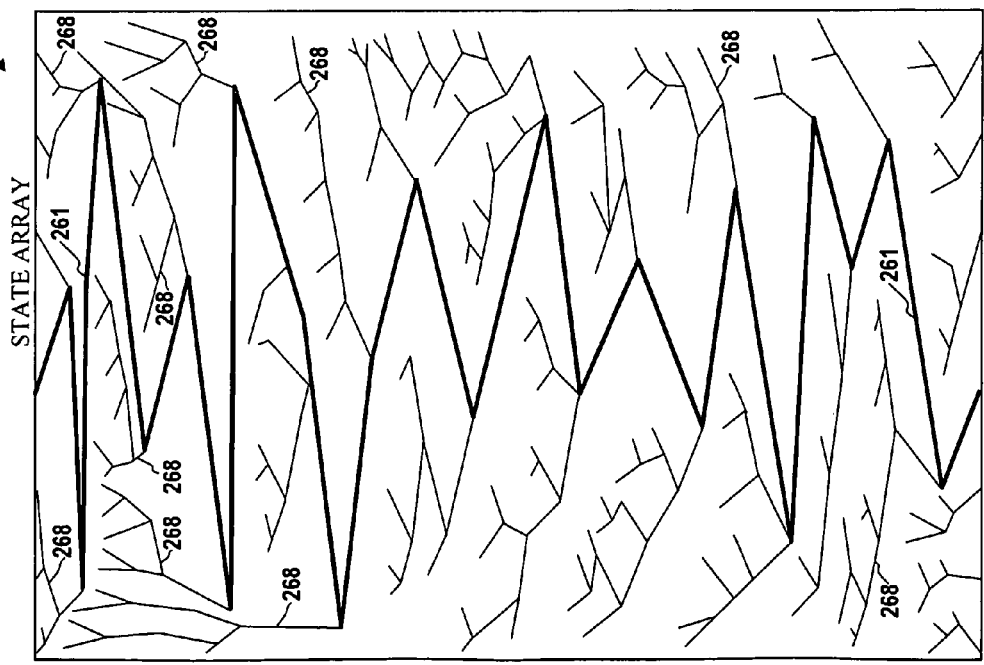
FIG. 2D is a diagram of state array 204, according to some embodiments of the invention.

FIG. 2D is a diagram of state array 204, having state array addresses located throughout state array 204 according to some embodiments of the invention. In some embodiments, path 261 traverses through the addresses of state array 204 according to the addresses provided by the current-state-address unit (e.g., current-state-address unit 112 of FIG. 2A). In some embodiments, path 261 traverses through state array 204 beginning at the top of state array 204 and continues to traverse down through state array 204. Dendrites 268 represent locations in state array 204 that eventually connect with path 261. Current-state addresses in the state-array locations that are not located directly on path 261, will eventually lead to path 261 by traversing the state-array locations located along the dendritic paths and when a state-array location on the path is encountered all following state-array locations will be contained on the path. That is, once a current-state address in the state array 204 is located in a state array location contained on the path, all future current-state addresses will also be on the path. Further, in some embodiments, once a current-state address is on the path, a future current-state address cannot be located in a state-array location that is not on the path. Dendrites 268 can be thought of as tributaries (as an analogy) that flow into a river (the path in this analogy), in that all paths along a tributary with eventually lead to the river and once the tributaries always flow in one direction into the river.

FIG. 2E is a diagram of state array 205, and represents the node locations of path 261 as path 261 traverses through the state array 205 according to some embodiments of the invention. In some embodiments, the node locations are the locations in the state array that corresponds to the current-state addresses.

FIG. 2F is a diagram of state array 206, including path 261 and dendrites 268 as described above and end-around path 269 and cycle 265 according to some embodiments of the invention. Cycle 265 includes both the complete path 261 that traverses through state array 206 and end-around path 269 that traverses from the last state-array location based on a last current-state address at about the end state array 206 to the first state-array location corresponding to a first current-state address at about the beginning of the state array 206.

FIG. 2G is a diagram of state array 207, is another representation of cycle 265 as it traverses through and completes an end-around from about the end of the state array 207 to about the beginning of state array 207 according to some embodiments of the invention. State array 207 further includes start boundary 262 and trace boundary 263 wherein, in some embodiments, dendrites corresponding to state-array locations located above start boundary 262 (e.g., dendrites that begin at points A, B, C, D or E in FIG. 2G) will encounter path 261 and therefore cycle 265 at a location on path 261 (e.g., at point F for points A, B, C, D and E) that is above trace boundary 263. This is in contrast to dendrites corresponding to state-array locations that start below the start boundary 262 (e.g., dendrites that begin at points G, H, i, J, K or L) which do not necessarily encounter path 261 at a state-array location located above the trace boundary 263. That is, in some embodiments, all dendrites having a starting point located above the start boundary will join path 261 at a point located above the trace boundary 263, but not all dendrites having a starting point located below the start boundary will join path 261 at a point located above the trace boundary 263.

FIG. 2H is a diagram of state array 208, representing trace 266 traversing state array 208 on path 261, according to some embodiments of the invention. In some embodiments of the present invention, a trace 266 is defined as the portion of path 261 located below the trace boundary 263. That is, trace 266 includes only state-array locations that are located below the trace boundary 263. Note that in contrast to a cycle, trace 266 does not perform an end around when the last state-array location located at about the end of the state array is encountered. Rather, trace 266 begins at the first state-array location that is located below the trace boundary 263 and trace 266 end at the last state-array location at about the end of the state array corresponding to the last current-state address and as described above, as long as the starting dendrite begins at a point that is located above start boundary 262 the dendrite will converge and join the path at a location that is above trace boundary 263, ensuring that only a single trace (i.e., a unique set of state-array locations located below the trace boundary) will exist.

FIG. 2i is a diagram of state array 209, and represents the node locations (black ovals) of path 261 and trace 266 through the state array 209 according to some embodiments of the invention. In some embodiments, the node locations are the locations in the state array that corresponds to the current-state addresses.

Figure 3:
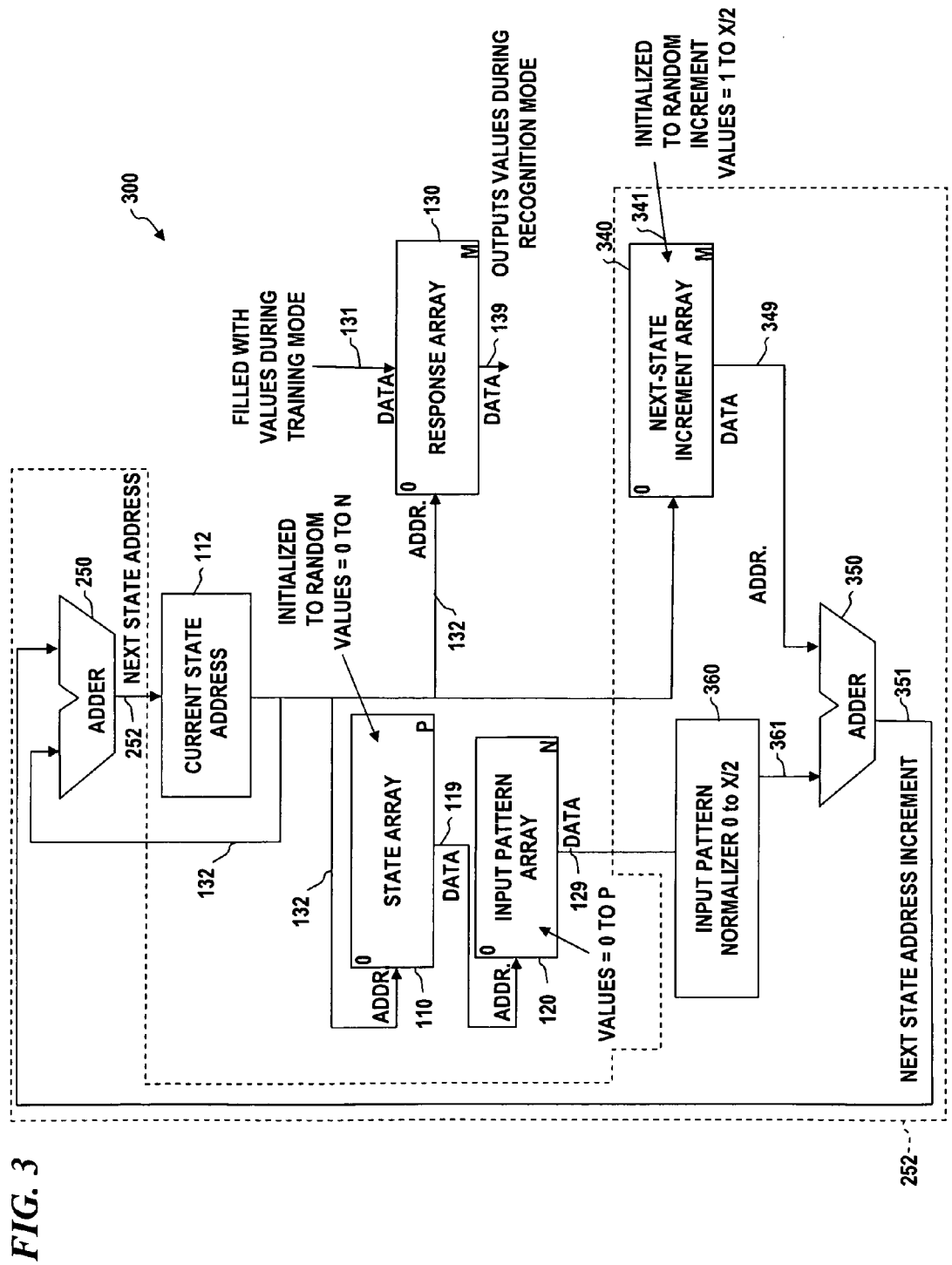
FIG. 3 is a block diagram of another limited jump pattern-recognition system 300, according to some embodiments of the invention.

FIG. 3 is a block diagram of another limited jump pattern-recognition system 300, according to some embodiments of the invention. LJPR system 300 provides an alternative next-address generation mechanism, wherein a single NSIA 340 provides approximately half of the branch (e.g., a random value between 1 and X/2) and the data 129 from the input pattern array 120 is normalized (by input pattern normalizer 360) to a value of between 0 and X/2, and these two values (the partial next address increment 349 from NSIA array 340, and the normalized version 361 of input pattern value 129) are added together by adder 350 to provide the next address increment 351, which is then added to the current address 132 by adder 250 to obtain the next current state address in register 112. Other aspects of this embodiment are as described above.

Representing Patterns by a Random Set of Addresses Using Cycles Offers Many Advantages:

SIMPLICITY OF IMPLEMENTATION: The APM is based on simple rules and implemented basically without computation. Its simplicity accounts for its high speed and offers the potential of simple hardware implementation and for parallel operation of multiple APMs by independent or successive APM processors. In some embodiments, an APM processor is the code and memory used to sample an input data pattern (which may be the result of preprocessing an earlier input pattern (e.g., to detect edges or enclosed areas in an image)) and to follow or process a path through a state array. Note that the actual path taken, in some embodiments, is not recorded but rather a hash code is generated based on whether the path included a certain set of addresses (generally, that set of addresses is spread out across all or a large portion of the state array's address space). For example, the state array could have 1, 4, or 16 million addresses (or any other suitably large number of addresses), and 10 hash codes could be generated each having 20 bits (a 1-megabyte addresses space for each of the one or more recognition arrays or tables), and each bit of each hash tracks, for example, 88 addresses (these 88 addresses comprise one "vertical sensor" which determines the value of one bit of one hash) and whether the path encountered any of those addresses (thus a total of 10 hashes times 20 bits/hash times 88 addresses/bit, which equals 17600 addresses of the suitably large number of addresses used for the state array). In other embodiments, other numbers of hashes, bits per hash, and/or numbers of addresses per bit (number of addresses tracked per vertical sensor).

COMMON LANGUAGE FOR DIFFERENT PATTERN INPUTS: Cycles are a set of "random" addresses in memory (note that while these addresses in one of the cycles appear random due to the spread values loaded into the state array and/or next-address-increment array, the set of addresses of a cycle will always be the same for a given input pattern). A new pattern input (i.e., the new data into an input-pattern array to be processed by another APM processor) can be created simply by incrementing a value at these addresses in another memory, or by using vertical-sensor bits from one path, or by using pattern identifiers that were located using the path or hashes derived from the path. Visual, auditory, and other sensory patterns are all represented in the same manner and there cycles can be superimposed in the same memory to form a new input pattern. An APM can be applied to the new patterns to train associations between different sensory inputs.

AUTOMATIC SEGMENTATION OF TIME VARYING PATTERNS: The process of sampling the input pattern can occur on a continuous basis without defining an initial state. Responses emerge and training is enabled only when a cycle is present. If the input pattern is changing rapidly no cycle can emerge. If the pattern stabilizes for at least the time of the minimum cycle training is enabled and/or a response can be generated. This allows the potential of automatic segmentation of time varying patterns such as continuous speech.

TEMPORAL AND SPATIAL INTEGRATION: Cycles from patterns recognized within time varying patterns can be superimposed to create a new input pattern to be trained and recognized at a higher level of temporal integration. The same applies to spatial integration of patterns.

LARGE ASSOCIATIVE CAPACITY: In one current example, a cycle of length approximately 3700 addresses within an address space of 1 million addresses is created for each pattern. If the sequence of addresses in the cycle is also considered in its uniqueness then the number of possible unique cycles is very large. Basically capacity relates to the number of possible different address sequences of 3700 exist within 1 million. Clarification on how this is implemented is given below under the category of vertical sensors FUZZY RECOGNITION: Intuitively it would seem likely that similar patterns would create similar cycles. This is the case and is an extremely important advantage that is discussed in more detail below.

Vertical sensors—detecting cycles

In the conceptual example described above, trained responses are stored in response memory at the addresses within the cycle. With a cycle length of 3700 and 1 million available addresses the response memory would quickly fill up. Vertical sensors provide the solution for this.

The term vertical sensor is used to convey how cycles are detected. Conceptually, if one considers that a cycle is generated in a two-dimensional memory plane, the vertical sensor detects the presence or absence of a cycle address within a small region of this plane and communicates this information to a next higher-level memory plane. The set of addresses sensed is called the vertical sensor field. (See FIG. 7A.)

For the current example, this cycle distributes its 3700 addresses randomly throughout the one-million-memory plane. Approximately one cycle address for every 270 memory addresses. A close approximation of the required vertical sensor field size can be computed as follows: For the current example a vertical sensor field size of 1 would have a probability of 269/270 (i.e., 0.9963) of NOT including a cycle point. A vertical sensor field size of 2 would have a 0.9963× 0.9963 or 0.9926 probability of not including a cycle point. In the current example the required size of the sensor field is N where $(0.9963)^N=0.5$ probability. In this case N is 186. That is, each vertical sensor with a sensor field size of 186 addresses (random or consecutive) will have a 50/50 chance of including a cycle point. If the cycle is present, then the vertical sensor bit is set to 1, if not, it is set to 0. Twenty-six vertical sensor bits (corresponding to twenty-six addresses in the state array and the corresponding twenty-six addresses in the vertical-sensor array; these twenty-six addresses can be consecutive addresses or spread out) can produce a unique binary number (of 26 bits) (called the path-hash code (also called the cycle-hash code if the path is determined by detecting a cycle, or a trace-hash code if the path is determined by following a path beyond a trace boundary)) associated with that input pattern, and which can address a response memory of 64 million locations. The path-hash codes each address the response memory for training and response. In this example there could be 1,000,000 divided by (186 times 26) or 206 path-hash codes generated in one cycle. If ten of these path-hash codes (of the 206 possible path-hash codes) are used, each addressing one of ten independent response tables a total of 640 Million response addresses would be available. In actual applications of some embodiments only 10 path-hash codes (of the 206 possible path-hash codes) are used (each path-hash code is 20 bits which addresses 1 MB of memory, there being 10 MB of memory used for the ten response tables, each of which is addressed by one of the ten path-hash codes; the ten tables being used for voting if they do not all agree (independent recognizers)). Multiple cycle codes are used to provide redundancy to the recognition. Theoretically it is possible to have a completely different pattern generate the same cycle code, however, since each cycle code is an independent recognition it is not likely that more than one would do the same mapping. Compared to the conceptual example the individual vertical sensor bit status is superimposed in another memory to create new input patterns and the cycle code(s) address the response memory for training and response.

Figure 4:
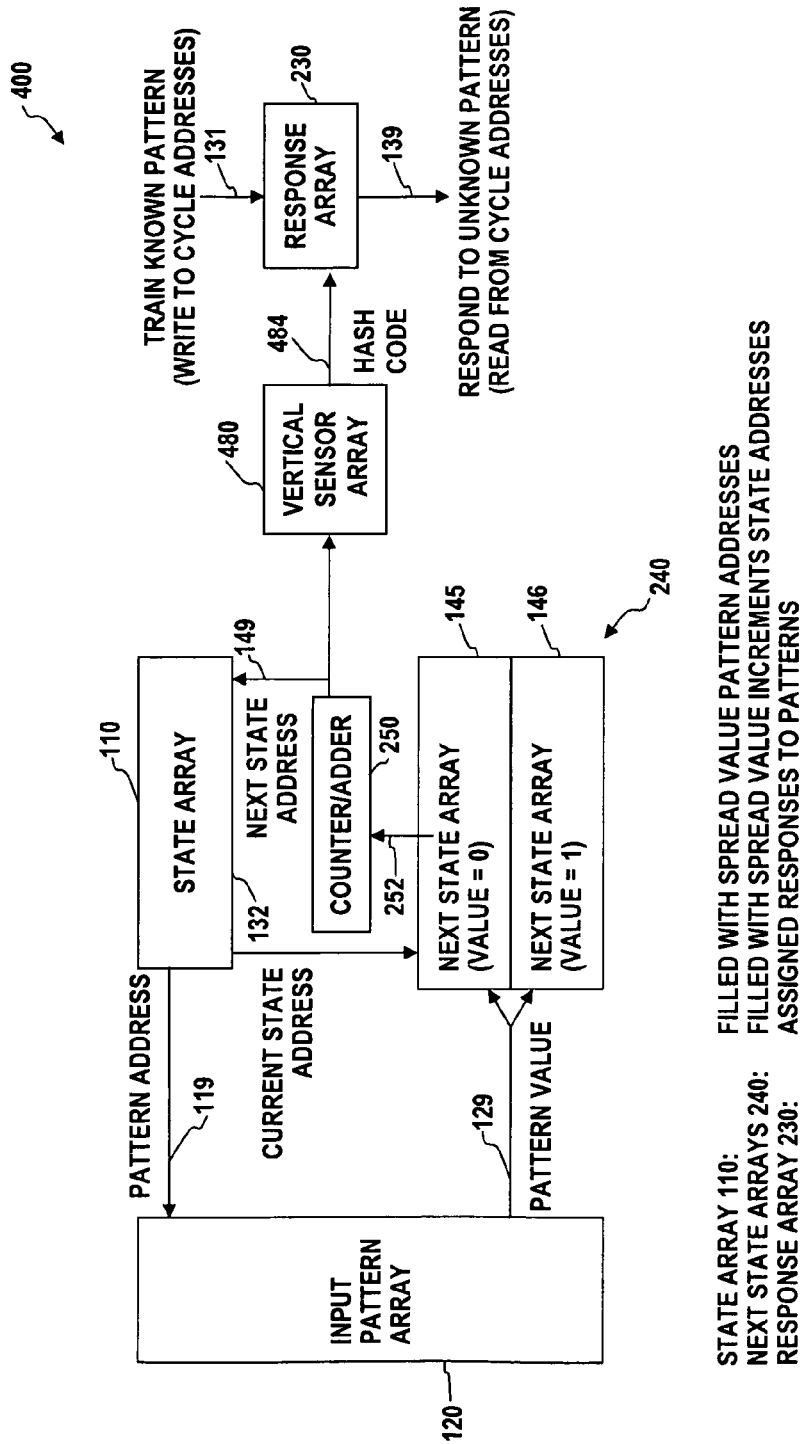
FIG. 4 is a conceptual block diagram of a limited jump pattern-recognition system 400, according to some embodiments of the invention, which can be implemented in software and/or hardware.

FIG. 4, shown below, is one actual implementation concept of the APM is somewhat different than the concept of FIG. 1B. In some embodiments, state array 110 is a one-dimensional array of 64,000 addresses and the counter/adder value is the next state. The next state arrays 240 contain random numbers that increment the counter. The random numbers range from 1 to 256 and therefore the average increment of the counter is 128. When the counter exceeds 64,000 the counter rolls over to the remainder. A cycle is detected when the next state address is the same as a previous state address, which cannot happen until the counter rolls over. Therefore with an average step size of 128 the average cycle length is 64,000/128=500, and since the maximum step size is 256, the minimum cycle length is 64,000/256=250.

Another addition is the vertical sensor bit array. This array is the same size as the state array (1 by 64,000) and is also addressed by the next state address. When a cycle is present its content identifies which bit of which hash code to set to binary 1 or 0.

Figure 5A:
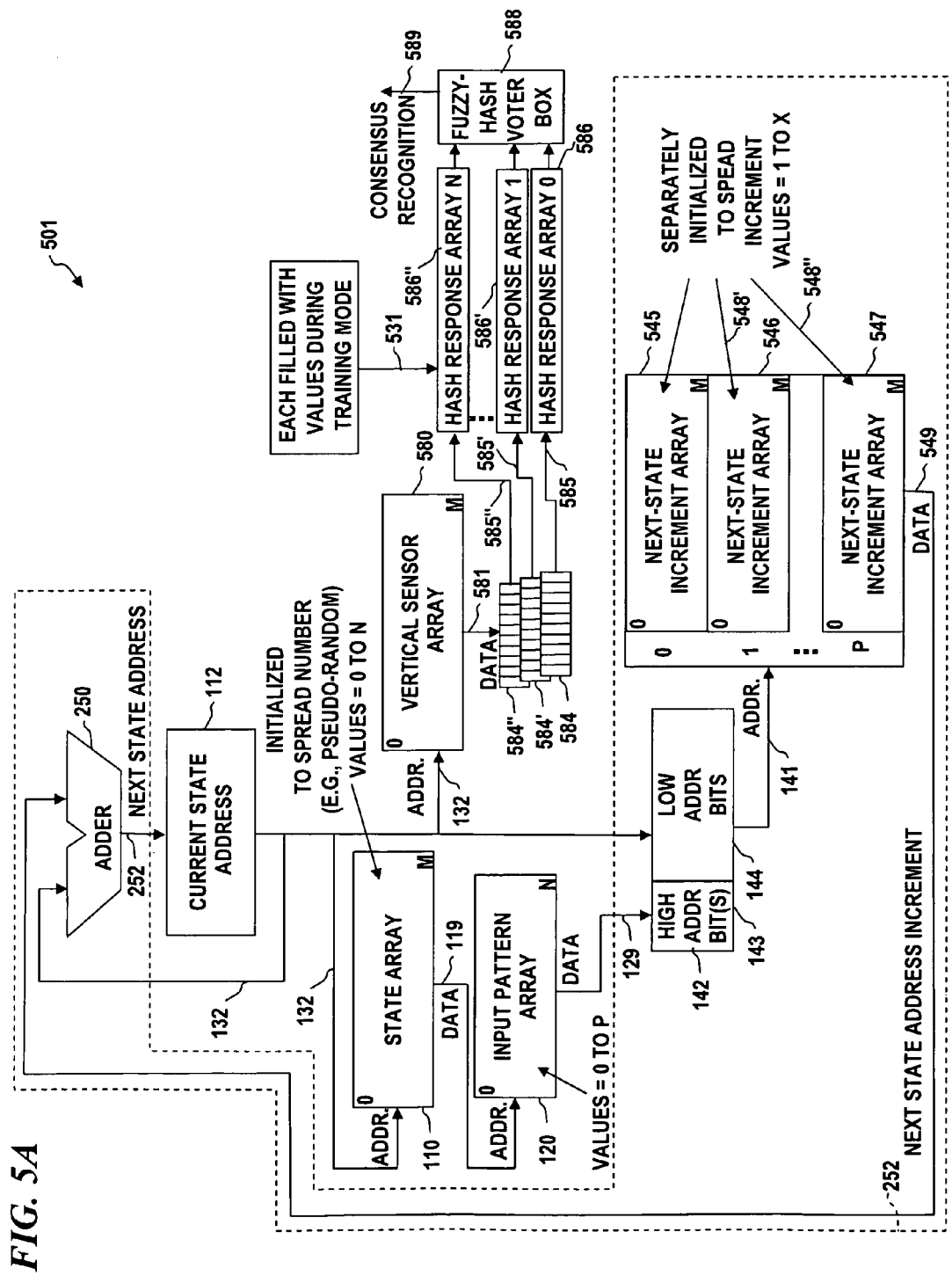
FIG. 5A is a block diagram of yet another limited jump pattern-recognition system 501, according to some embodiments of the invention.

FIG. 5A is a block diagram of yet another limited jump pattern-recognition system 501, according to some embodiments of the invention. In some embodiments, LJPR system 501 uses path-hash codes 584, 584', . . . 584" whose binary bit positions are filled with binary value outputs from what are called "vertical sensors" 581. Each vertical sensor detects the presence or absence of a cycle or trace address within a predetermined number of state addresses (called the vertical-sensor field), which in some embodiments, are consecutive addresses (e.g., in some embodiments, 88 addresses are used for each vertical sensor (each of which determined the value of one bit of one hash code) if the maximum jump size is about 256 and the average jump size is about 128), and each vertical sensor sets its respective associated vertical-sensor bit in one of the path-hash codes 584, 584', through 584". In some embodiments, once a complete cycle or trace has been hashed (i.e., every location of the cycle or trace is read, and for each cycle or trace location within one of the vertical sensors, the corresponding vertical-sensor bit in one of the path-hash codes 584, 584', through 584" is set (or left unset if none of the addresses for the corresponding vertical sensor is in the path)), and each of the path-hash codes 584, 584', through 584" is used as an address 585, 585', through 585" into one of the hash-response arrays 586, 586', through 586" (during training mode, a response value (e.g., an ASCII "a" might be a response in a handwriting pattern recognition system for handwriting patterns that are to be recognized as "a") is written to the respective addressed locations in hash-response arrays 586, 586', through 586", and then later during the recognition mode, the response values are read from each of the hash-response arrays 586, 586', through 586"). In some embodiments, a fuzzy-hash voter box will receive the respective responses from hash-response arrays 586, 586', through 586", and generate a consensus recognition response 589 based on a combination of the responses (e.g., by voting (one response-one vote), where the most numerous response is output (or if a tie in the counts of responses, two or more responses might be output, in some embodiments), or by a weighted average wherein certain of the responses could be weighted more than others during voting).

Figure 5B:
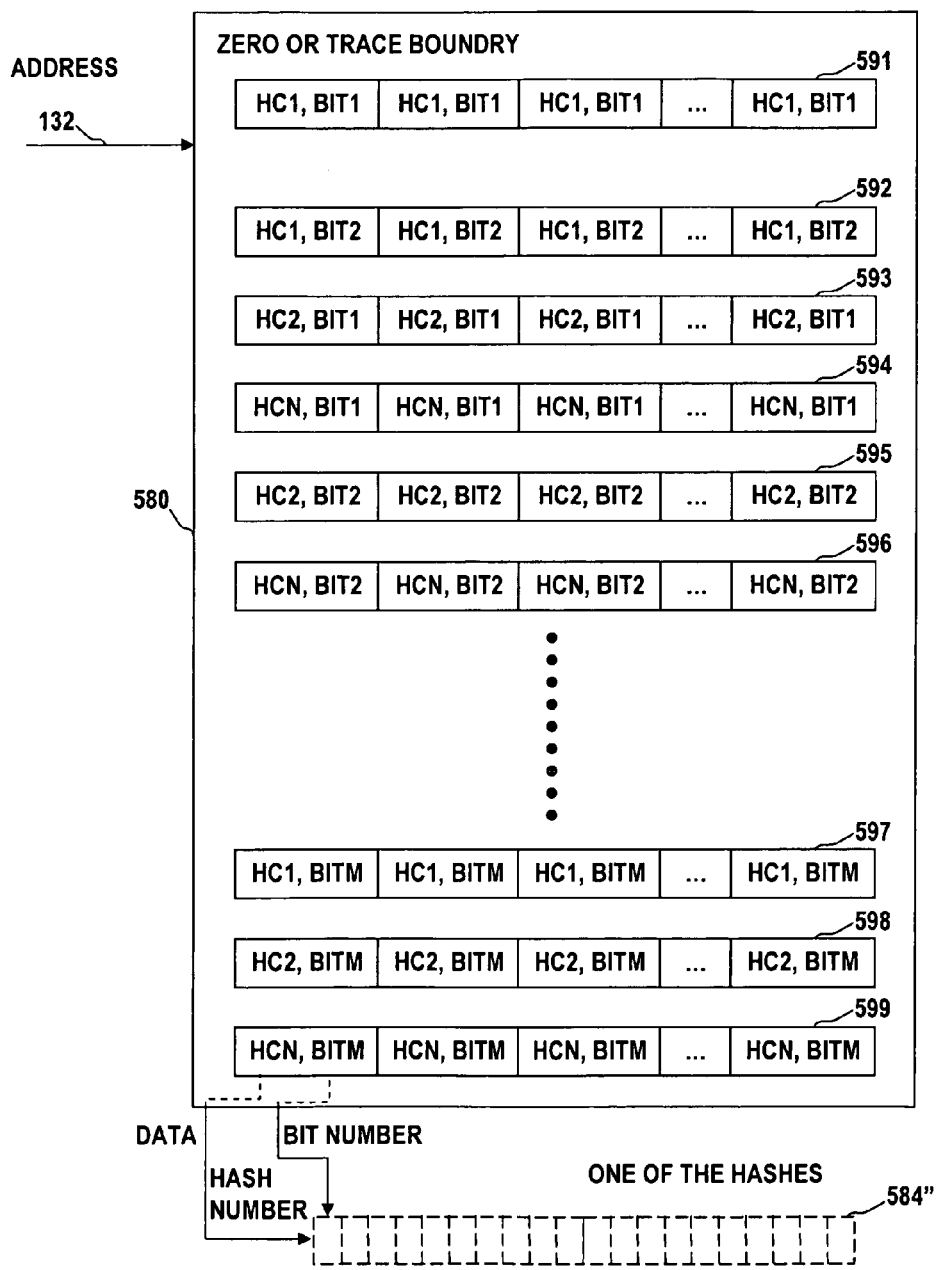
FIG. 5B is a more detailed block diagram of a limited jump pattern-recognition system 502 that uses a vertical sensor array 580 to generate hashes 584, according to some embodiments of the invention.

FIG. 5B is a more detailed block diagram of a limited jump pattern-recognition system 502 that uses a vertical sensor array 580 to generate hashes 584, according to some embodiments of the invention. In some embodiments, the first bit of the first hash is set if any of the addresses in group 591 are used in a path through the vertical-sensor array 580 (generally the same as the path through the state array, although in some embodiments, other ways of finding equivalent or corresponding addresses between the two arrays is used), the second bit of the first hash is set if any of the addresses in group 592 are used in a path through the vertical-sensor array 580, and so on such that the $M^{th}$ bit of the first hash is set if any of the addresses in group 597 are used in a path through the vertical-sensor array 580. Similarly, the first bit of the second hash is set if any of the addresses in group 593 are used in a path through the vertical-sensor array 580, the second bit of the second hash is set if any of the addresses in group 595 are used in a path through the vertical-sensor array 580, and so on such that the $M^{th}$ bit of the second hash is set if any of the addresses in group 598 are used in a path through the vertical-sensor array 580. If N hashes are implemented, the first bit of the $N^{th}$ hash 584" is set if any of the addresses in group 594 are used in a path through the vertical-sensor array 580, the second bit of the $N^{th}$ hash 584" is set if any of the addresses in group 596 are used in a path through the vertical-sensor array 580, and so on such that the $M^{th}$ bit of the $N^{th}$ hash 584" is set if any of the addresses in group 599 are used in a path through the vertical-sensor array 580.

Figure 5C:
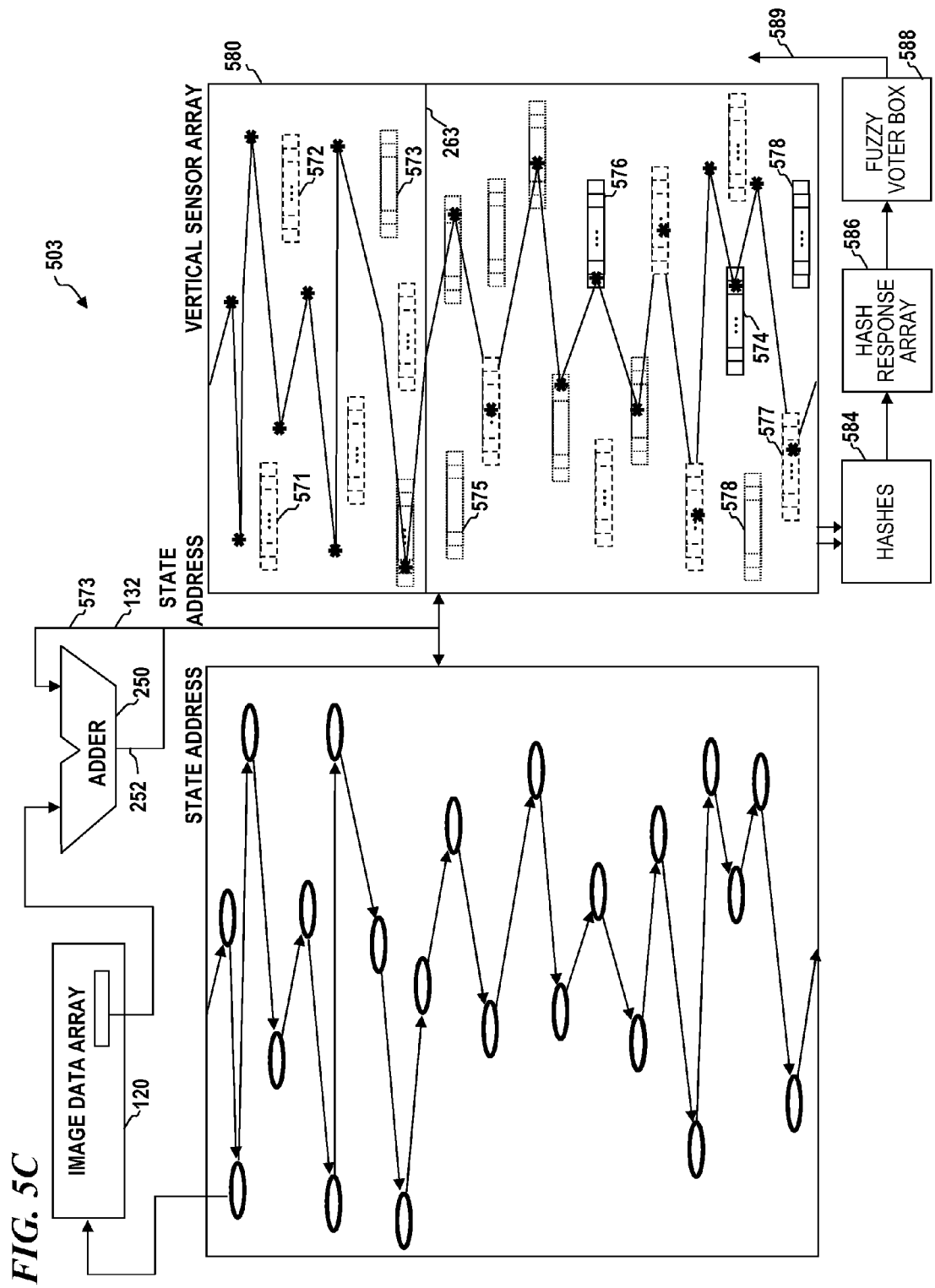
FIG. 5C is a more detailed block diagram of a limited-jump pattern-recognition system 503 that uses a vertical sensor array 580 to generate hashes 584, according to some embodiments of the invention.

FIG. 5C is a more detailed block diagram of a limited jump pattern-recognition system 503 that uses a vertical sensor array 580 to generate hashes 584, according to some embodiments of the invention. In some embodiments, the various bits of the first hash of a path (e.g., the sequence of addresses 132 used in the state array addressing) are set based on vertical sensors 571, 572 and 577 and the other vertical sensors shown in dashed lines relative to the path through the vertical-sensor array 580. Similarly, the various bits of the second hash for the path are set based on vertical sensors 573, 575 and 578 and the other vertical sensors shown in dotted lines relative to the same path through the vertical-sensor array 580. If N hashes are implemented, the various bits of the $N^{th}$ hash 584" are set based on vertical sensors 574, 576 and 578 and the other vertical sensors shown in solid lines relative to the path through the vertical-sensor array 580.

Figure 6:
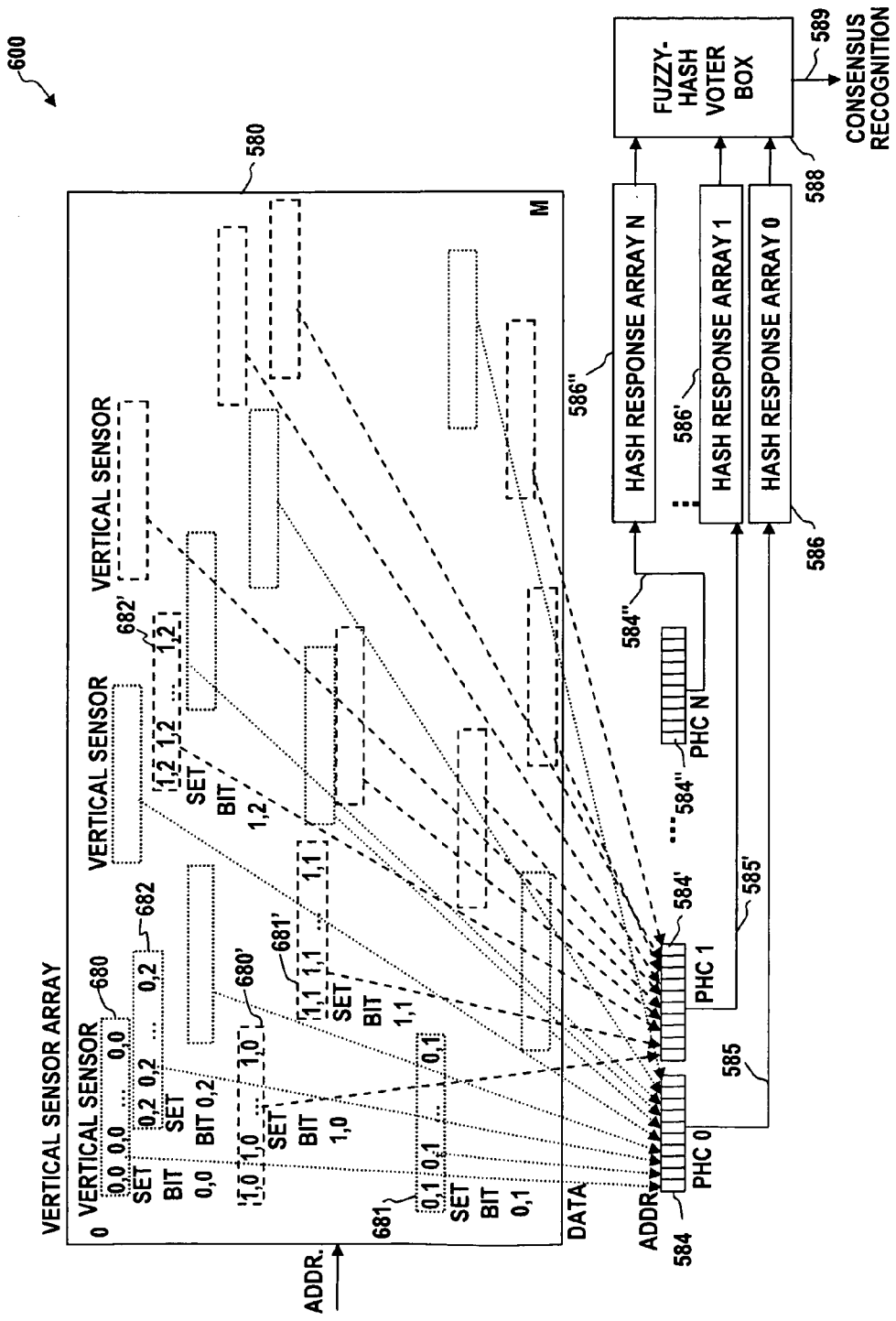
FIG. 6 is a block diagram of a vertical sensor system 600, according to some embodiments of the invention, which uses path-hash codes and provides fuzzy pattern recognition.

FIG. 6 is a more detailed block diagram of a vertical sensor system 600, according to some embodiments of the invention, which uses path-hash codes and provides fuzzy pattern recognition. Since FIG. 6 depicts an embodiment using cycles and cycle detection, the path-hash codes (PHCs) in this case are cycle-hash codes (CHCs). In some embodiments, the vertical sensor system 600 is used with APM processors using cycle detect to generate cycle-hash codes (CHCs) used to identify the path of an input pattern, and in other embodiments, vertical sensor system 600 is used with APM processors using a trace boundary to generate trace hash codes (THCs) used to identify the path of an input pattern. The resulting hash codes (CHCs or THCs) are sometimes generically referred to as path hash codes (PHCs). In some embodiments, a vertical sensor array 580 has locations zero to M (in other embodiments, the locations start at the trace boundary address and extend to M). In some embodiments, all entries that are not used for a vertical sensor are set to a null value such as zero or hexadecimal 'FFFF'x (all bits being binary ones), and each location used for a vertical sensor has data specifying a first index value (path hash code (PHC) identifier) corresponding to one of the hash codes 584 (e.g., if the null value is zero, then the first path-hash-code identifier is one, which indicates PHC0, the second hash identifier is 2 which indicates PHC1 584', and so on through the $N+1^{st}$ hash identifier indicates PHCN 584"), and a second index value corresponding to one of the bits in the selected one of the path-hash codes (PHC) 584, 584', through 584" determined from the first index value. In some embodiments, each vertical sensor is a string of N consecutive addresses, each having the same pair of index values (in some embodiments, both values are encoded into a single number), wherein the same PHC value (the index or address of the selected PHC 584 that receives the output of that vertical sensor) is loaded into its first index value, and the same bit value (the bit number that receives the output of that vertical sensor) is loaded into its second index value. In some embodiments, every bit in all the PHCs 584 is initialized to zero. If any location in the vertical sensor field is visited by a path (a detected cycle or a trace), the corresponding bit in the respective PHC 584 is set. Each respective PHC 584, 584' through PHC 584" then contains a different hash (the result of lossy data compression) of the cycle or trace being trained or recognized. Thus a visit during a detected cycle or trace to any location in vertical sensor field 680 sets a one in bit 0 of PHC0 584, a visit during a detected cycle or trace to any location in vertical sensor field 681 sets a one in bit 1 of PHC0 584, and a visit during a detected cycle or trace to any location in vertical sensor field 682 sets a one in bit 2 of PHC0 584, and visits to any other vertical sensor field 680 (shown by small-dot outlines) will set the corresponding other bit of PHC0 584. Similarly, a visit during a detected cycle or trace to any location in vertical sensor field 680' sets a one in bit 0 of PHC1 584', a visit during a detected cycle or trace to any location in vertical sensor field 681' sets a one in bit 1 of PHC1 584', and a visit during a detected cycle or trace to any location in vertical sensor field 682' sets a one in bit 2 of PHC0 584', and visits to any other vertical sensor field 680' (shown by small-dash outlines) will set the corresponding other bit of PHC1 584'. Thus, each path-hash code PHC0 584, PHC1 584' through PHCN 584" has a different hash from a different set of vertical sensors in the vertical sensor array 580.

In one implementation example the next-address increment is RANDOM(1:256), so the average increment for the next state address is 128. In some embodiments, each vertical sensor field is a number of addresses selected such that for half of the possible paths (cycles or traces), the output bit for the vertical sensor field is 0 and the other half output a bit of 1; e.g., in some embodiments, a vertical sensor detects the presence or absence of a cycle or trace address within N consecutive state addresses (called the vertical sensor field) and sets the associated vertical sensor bit (N computed from $(127/128)^{**}N=0.5$ where N is 88 as described in paragraph 0066). Therefore, the probability that a cycle or trace address is contained within the range of the vertical sensor field is 0.5. The Y-bit path-hash code is created by concatenating Y vertical sensor bits corresponding to the status of each vertical sensor. The actual content of the N consecutive state addresses is a number, representing the first index and second index that identify which bit to set in which hash code. In this implementation 10 hash codes are used to access 10 different response arrays. Each hash is 23 bits therefore the 10 response memories are each 8 Meg or 80 Meg total.

With a vertical sensor field of 88 addresses of the state array and 10 hash codes of 23 bits each, the total number of state addresses covered by vertical sensors is 20,240. The vertical sensor field for each bit of each hash code is evenly spaced over the state addresses. Fields from different hash codes are interleaved and not overlapping. Each hash code is an independent hash of the input pattern.

An important property of the hash codes is that they are a fuzzy hash. In some embodiments, similar input patterns create similar cycles or traces that can generate the same hash code or similar hash codes (hash codes are similar if the differ by just a few bits). During training all ten hash codes that address the response memory can be assigned the response. In response mode, a response can be identified if 3 or more responses are the same, also contributing to the fuzzy nature of the hash.

Adjacent Hashes

A further method of improving the pattern-recognition systems of the present invention is to use adjacent hashes in training and recognition to enhance the degree of hash fuzziness. As discussed earlier, similar input patterns generate identical or similar hash codes because the corresponding cycles or traces are similar (i.e., they have overlapping state addresses). As used herein, a similar hash code is one that differs only by a few bits from another hash code and are called adjacent hash codes (e.g., a three-bit hash code will have three adjacent hash codes that differ by only one bit, three adjacent hash codes that differ by two bits and one adjacent hash code that differs by three bits, as shown in Table 2).

TABLE 2

| | |
|---|---|
| 3 bit Hash Code | 0 0 0 |
| Adjacent Hash Codes | 1 0 0 |
| (1 bit difference) | 0 1 0 |
| | 0 0 1 |
| Adjacent Hash Codes | 1 1 0 |
| (2 bit difference) | 1 0 1 |
| | 0 1 1 |
| Adjacent Hash Codes | 1 1 1 |
| (3 bit difference) | |

During training the adjacent hash codes can also be trained (i.e. the pattern ID is stored in the response memory (hash table)) as well as the original hash code. In a supervised training mode a known pattern is presented for training If similar patterns are to be recognized, the adjacent hashes are trained as well. The degree of fuzziness can be adjusted by setting the maximum number of bits that differ in the adjacent hash codes. In recognition mode the adjacent hashes can be generated and used as part of the consensus voting to determine the pattern's identity.

As shown in FIG. 3, another variation of the concept diagram relates to the pattern value. Rather than having a separate next state array for each possible pattern value, the pattern value is simply added to the counter along with the random increment. In this implementation only one next state array is needed. Variation in the pattern value itself provides the uniqueness to the next state address.

From the description above it would appear that the path-hash code is just another way of generating a hash code for the input pattern. This is true except for the very important difference that similar patterns generate similar cycles or traces and therefore similar or identical PHCs (CHCs or THCs). Even though there may be only 26 sensor fields represented in a path-hash code, each code essentially represents the whole input pattern. This is partially because each path address (once the cycle has been detected or the trace boundary is crossed) already has memory related to previously sampled points of the input pattern. Typically, ten path-hash codes are more than sufficient to recognize the pattern and provide fuzzy recognition. In some embodiments, if even just two of the path-hash codes match one another (or are adjacent hashes differing by only one or two bits), this is sufficient to recognize the pattern and provide fuzzy recognition.

Figure 7A:
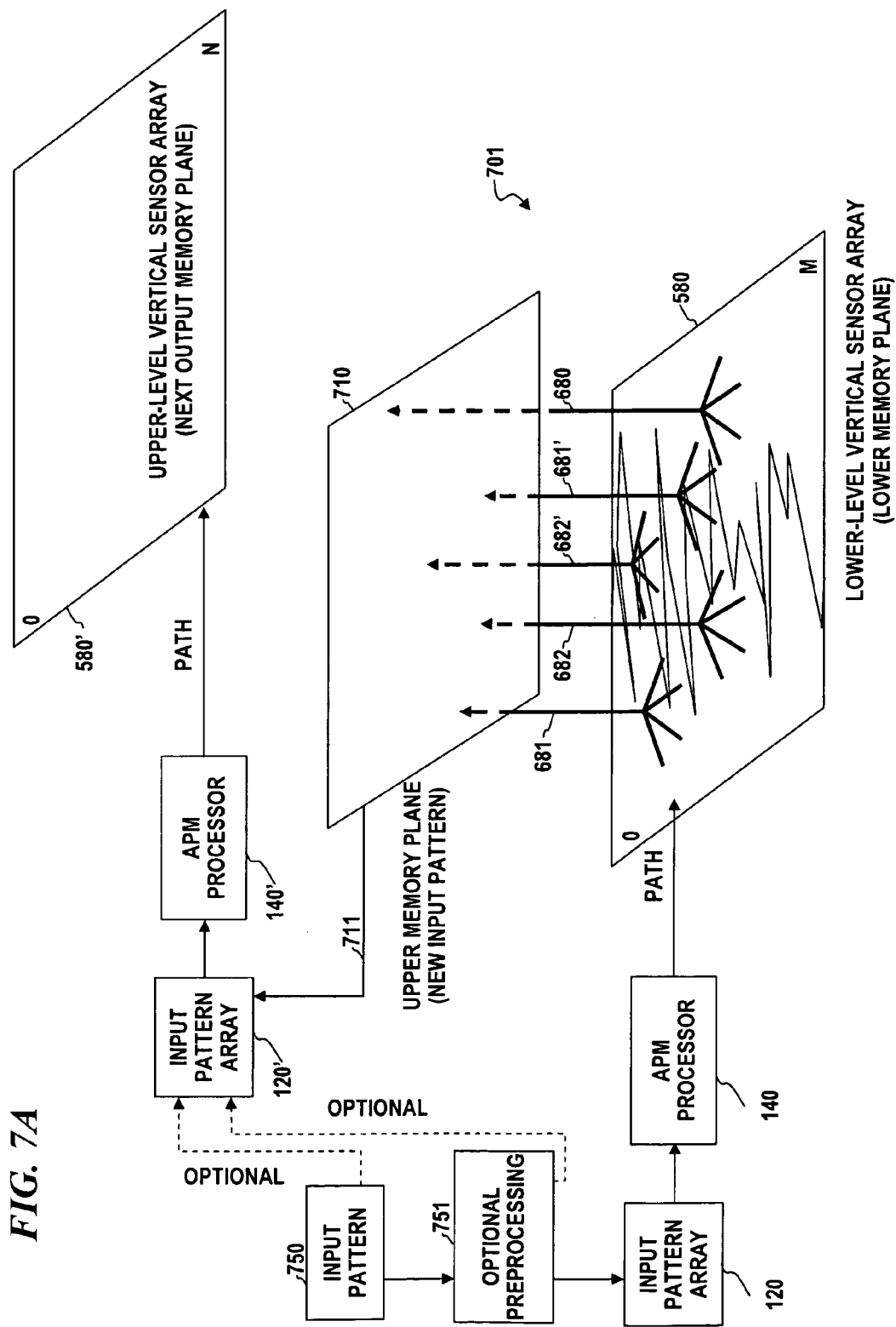
FIG. 7A is a diagram of a recursive low-level-higher-level vertical-sensor system 701, according to some embodiments of the invention.

FIG. 7A is a diagram of a recursive low-level-higher-level vertical-sensor system 701, according to some embodiments of the invention. In some embodiments of system 701, an input pattern 750 is optionally processed by a preprocessing operation 751 and the result (either the original input pattern and/or the results from the preprocessing operation 751) is loaded into input-pattern array 120, which is then processed by APM processor 140 to obtain a path that is used to access various vertical sensors 681, 681', 682, 682' and 680. The data from these vertical sensors and/or the pattern indications fetched from hash tables indexed by the hashes formed from the vertical sensors are input to a higher-level upper memory plane 710 (essentially, the results are further preprocessing to the input pattern) and the data from upper memory plane 710 and optionally data from the original input pattern 750 or the earlier preprocessing operation 751 are then input to a next input pattern array 120', which is then processed by APM processor 140' to obtain a path through memory 580' that is used to access various vertical sensors (essentially higher-level vertical sensors that can be used to generate higher-level hashes that are then used to retrieve higher-level pattern indicators from their respective hash tables and/or fuzzy and/or adjacent hashes. This entire process can optionally be executed yet again to use the results from the higher-level pattern indicators for further APM processing in yet higher levels of recognition. This can be used, for example, to process video sequences (e.g., following moving objects) stereo image sets (to determine depths of objects) seismological data (e.g., to anticipate earthquakes or volcano eruptions or to find oil-field locations), or other processing that initially does low-level recognition as a pre-processing step for higher-level recognition.

Figure 7B:
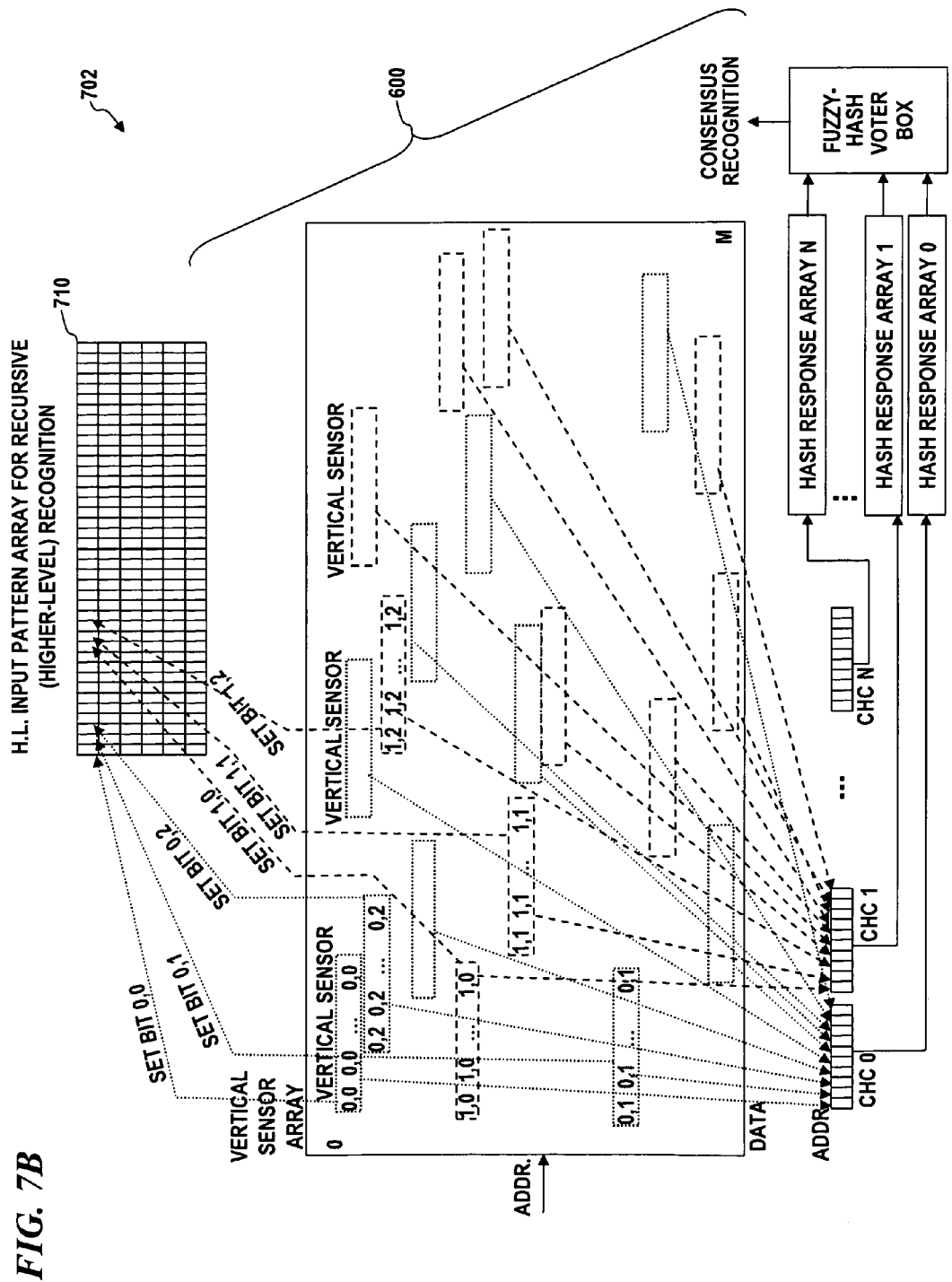
FIG. 7B is a block diagram of a vertical sensor system 700, according to some embodiments of the invention, which also implements upper-plane recursive pattern recognition.

FIG. 7B is a block diagram of a vertical sensor system 702, according to some embodiments of the invention, which also implements upper-plane recursive pattern recognition. As was described for FIG. 6, the output of vertical sensors 680, 681 and the like are used in some embodiments for the bits of PHC0 through PHCN. However, in some embodiments, as shown in FIG. 7B, the vertical sensors (either the same ones used for the PHC bits or a different set of vertical sensors) provide bits that are set in a high-level pattern array 710 for recursive (i.e., higher level) pattern recognition (in some embodiments, high-level pattern array 710 is also called the upper-memory plane). In some embodiments, once all portions of some or all of the original input data are analyzed, the values of high-level pattern array 710 are used as inputs for another pattern-recognition operation (e.g., they are input in whole or in parts into an input pattern array 120 of one of the above embodiments, and a pattern training/pattern recognition process is run against these outputs of the vertical sensors 680-681).

Figures 8, 9:
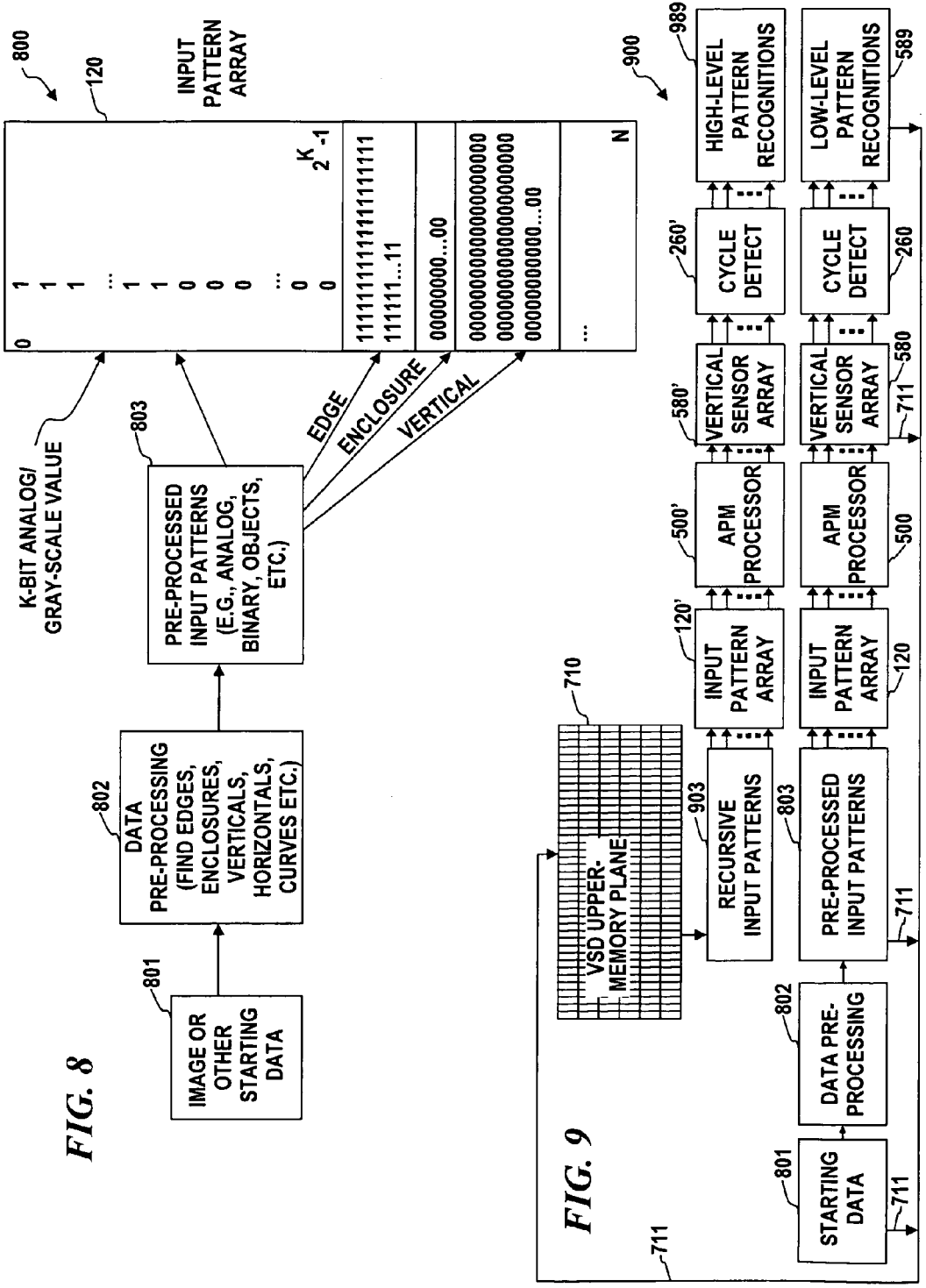
FIG. 8 is a block diagram of a pattern-data pre-processing system 800, according to some embodiments of the invention, which implements fuzzy magnitude sensing.
FIG. 9 is a block diagram of a pattern-recognition system 900, according to some embodiments of the invention, which implements upper-plane or higher-level cycle detection and pattern recognition.

FIG. 8 is a block diagram of a pattern-data pre-processing system 800, according to some embodiments of the invention, which implements fuzzy magnitude sensing. In some embodiments, system 800 starts with an image or other starting data 801, performs some preprocessing 802 to obtain pre-processed input patterns (e.g., analog values, binary (e.g., presence of edges, enclosures, vertical lines, horizontal lines, certain colors, and the like) for portions of the input data 801). In some embodiments, analog values are converted to a bar-graph format (e.g., a number of ones corresponding to the value, followed by zeros to fill out the field of $2^K-1$ bits). In some embodiments, analog values are converted to a bar-graph format (e.g., a number of ones corresponding to the value, followed by zeros to fill out the field of K bits). In some embodiments, binary values can be weighted by different amounts by repeating their values a different number of times for edges, enclosures, vertical lines, etc.

FIG. 9 is a block diagram of a pattern-recognition system 900, according to some embodiments of the invention, which implements upper-plane or higher-level cycle detection and pattern recognition. In some embodiments, the data is analyzed along the bottom row of blocks as described above, and data 711 from the vertical sensor array 580 (and/or optionally data 711 from starting data 201, pre-processed-input patterns 803 and/or low-level pattern recognitions) are output into the vertical sensor bit array 710 (i.e., the upper-level-memory plane) and placed into recursive patterns 903 and then recursively analyzed (processed again one or more times recursively) to obtain the high-level recognition 989.

Alternative to Cycles

In some embodiments, an alternative to generating a complete cycle is used to speed up the APM systems described in some embodiments above. In some of the embodiments described above, cycles are detected using a cycle-detection algorithm that detects a looping path obtained by processing a given input pattern with a given state array pattern and given next-state address pattern. As describe above, regardless of the starting state, the branching pattern or path will eventually end up in a loop branching pattern, herein called the cycle. The purpose for detecting a complete cycle is that the system is not aware of being on a path that will eventually end up in a looping pattern until the loop (i.e., cycle) has completed. A limitation of using complete cycles is that computational resources and memory are required to execute the cycle-detection algorithm. In some embodiments, the alternative to using complete cycles to determine that a state is on a looping path is to use only a portion of the path (herein called a trace) and use statistics as described below to determine whether a state is on a path that will eventually end up in a looping pattern. The use of traces as an alternative to cycles can be used without any loss in functionality and traces are faster than cycles because the cycle-detection array, cycle detection and write cycle ID can be eliminated. In some embodiments, all other components of the APM systems are as described previously.

In some embodiments, any portion of a looping path (i.e., a cycle) can be referred to as a memory trace or simply a trace and as is true for a cycle, a trace consists of a random set of addresses in the state array. In some embodiments, the state address starts at address 0 for each training or recognition process and a minimum number of steps through the state array are taken before vertical sensors are encountered. Delaying a minimum number of steps through the state array ensures that the state addresses converge to a trace that would be a portion of a looping path. With the state address starting at address 0, any vertical sensors that would be at the beginning of the state array would be highly dependent on the starting state regardless of the input pattern. Therefore, by waiting a minimum number of steps the trace is dependent on the input pattern and not the starting state. In some embodiments, as in the case of a cycle, there will be only one possible trace for each input pattern.

As mentioned previously, statistics are used to determine whether a state is on a path that will eventually end up looping. Specifically, the probability that a state is on a looping path after progressing through a particular number of states in the state array is used to determine when to start encountering vertical sensors. In some embodiments, the maximum step size determines the number of steps (from state 0) to delay before vertical sensors are encountered. Any state that occurs in the trace has some memory of the states preceding it and therefore memory of the corresponding input pattern samples. A large maximum step size results in a long memory and a short maximum step size results in a short memory. The memory associated with any maximum step size is related to the probability that a preceding state (N steps ago) still determined the current state. This relationship is described in Equation 1:

$$P = \left(\frac{(AvgStep - 1)}{AvgStep}\right)^N \quad (1)$$

where, P is the probability that the current state has not yet randomly landed on a looping path (the trace) for the current input pattern and AvgStep is the average step and is equal to the maximum step, MaxStep, divided by two (i.e. AvgStep=MaxStep/2) for a random step size of 1 to MaxStep. For example, with a MaxStep size of 256 and therefore an AvgStep size of 128 the probability of landing on a point on the looping path (or trace) for any given pattern is 1 in 128. The probability of NOT landing on it is 127/128. With random independent selections, the probability of not landing on the input pattern's looping path (or trace) is given by the probability of Equation 1 above. For the given example P=0.05 after 382 steps. That is, after 382 steps there is a 95% chance that the current state is on the looped path (or trace) created only by the current input pattern and not dependent on the state that occurred 382 steps ago. In this example, the vertical sensors would therefore begin after 382 steps and as the AvgStep size is 128, the vertical sensors would begin after state address 48,896 (i.e., 128×382). In some embodiments, the vertical sensors are encountered when the probability that the current state has not yet randomly landed on a looping path (i.e., the trace) for the current input pattern is equal to about 10% or less. In some embodiments, the vertical sensors are encountered when the probability that the current state has not yet randomly landed on a looping path (i.e., the trace) for the current input pattern is equal to about 7% or less. In some embodiments, the vertical sensors are encountered when the probability that the current state has not yet randomly landed on a looping path (i.e., the trace) for the current input pattern is equal to about 5% or less. In some embodiments, the vertical sensors are encountered when the probability that the current state has not yet randomly landed on a looping path (i.e., the trace) for the current input pattern is equal to about 2% or less.

In some embodiments, the size of the vertical sensor field is also computed from Equation 1, but with P substantially equal to 0.5 (i.e., the size of the vertical sensor field is log (0.5)/log((A−1)/A), such that the probability of any given trace or cycle using one of the bits in the vertical sensor field is about 50%). The size of the vertical sensor field is chosen such that there is an equal chance of the vertical sensor field encountering a state having a trace point and not encountering a state having a trace point. In the case described above, with the MaxStep size equal to 256, to achieve a probability of 50%, the vertical sensor field size is N=88. That is, each vertical sensor with a vertical sensor field size of 88 addresses (random or consecutive) will have a 50/50 chance of including a trace point. If the trace point is present, then the vertical sensor bit is set to 1, and if the trace point is not present, the vertical sensor bit is set to 0.

Figure 10:
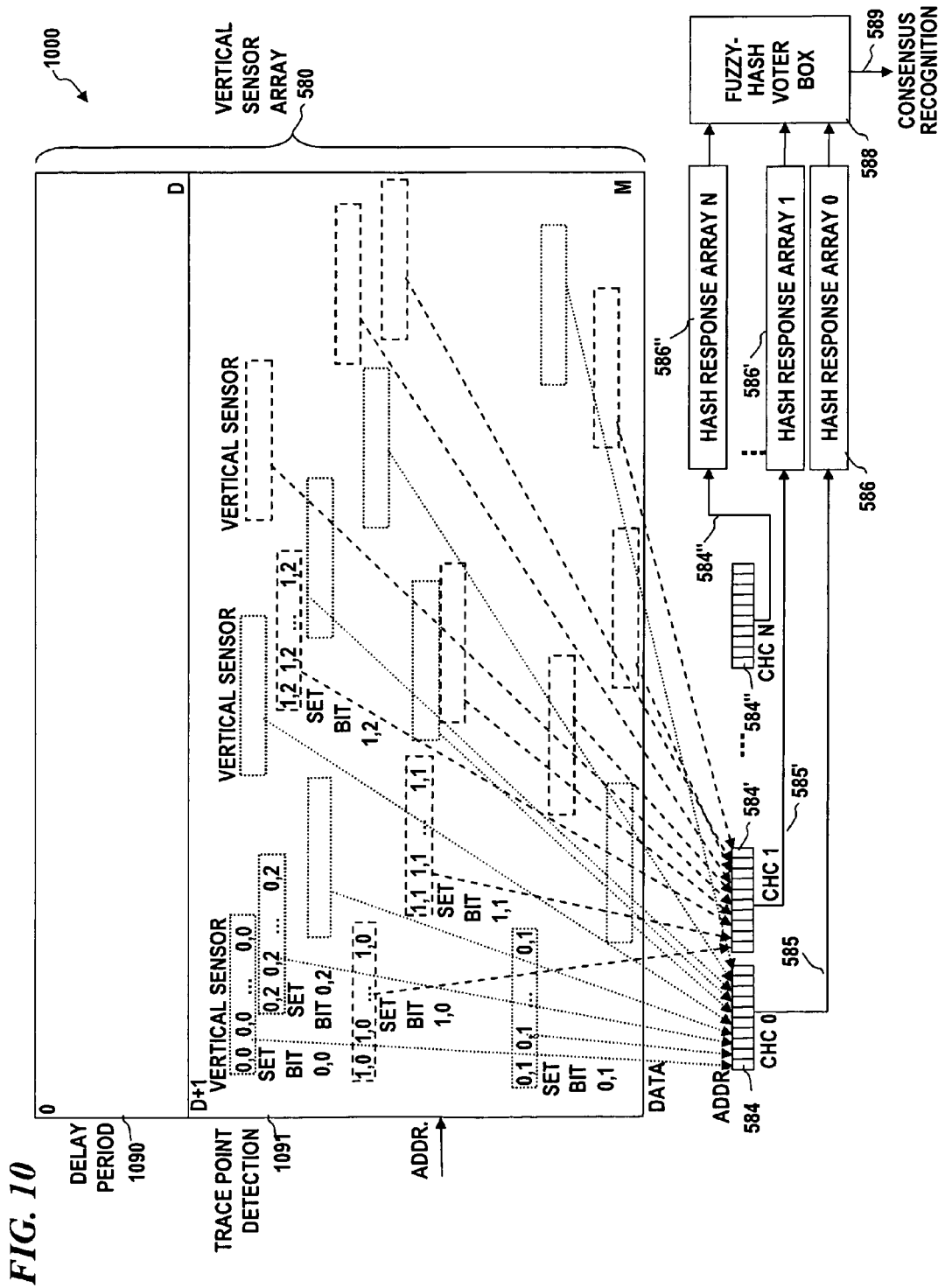
FIG. 10 is a block diagram of a vertical sensor system 1000, according to some embodiments of the present invention, which implements a delay prior to initiating trace point detection.

FIG. 10, is a block diagram of a vertical sensor system 1000, according to some embodiments of the present invention, which implements a delay period 1090 prior to initiating trace point detection 1091 to ensure the state has randomly landed on a trace point. In some embodiments, vertical sensor system 1000 can be used with previously described pattern-recognition systems. In some embodiments, vertical sensor system 1000 is similar to vertical sensor system 600 described in FIG. 6 and above except that vertical sensor system 1000 implements a delay period 1090 that includes vertical sensor array addresses 0 to D, prior to starting the vertical sensors and trace point detection 1091 at address D+1. That is, in some embodiments, the vertical sensor array has address locations from 0 to M, however the vertical sensors are not encountered until address location D+1 has been reached. Using the case described above, with the MaxStep size equal to 256 and the probability of Equation 1 set to 5%, the delay period would last until vertical sensor array address D=48, 896 and vertical sensors would begin at D+1=48,897.

Sampling the Input Pattern

A number in the input pattern could represent any number of features. Visual features could be edges, enclosures, intersections, etc. If the number represents a magnitude such as a gray level, similar magnitudes should have similar representations. The operation of the APM is not driven by mathematical representation therefore the number 10, for example, is totally different from the number 11 even though their magnitudes are similar. Given the way the APM concept is described a number of magnitude 10 would be assigned a completely different next state than the number 11. The solution is to sample magnitudes as an image of a bar graph. A bar graph image of magnitude 10 is very similar to a bar graph of 11. If the range of the magnitude were from 0 to 64 (64 bits, each bit is an address) a magnitude of 10 would have 10 lower bits set to a 1 and the rest 0. The full 64-bit range would be part of the sample space of the input pattern. In actual application the state array could include a fixed random magnitude that is compared to the sampled magnitude (for those sampled values that are a bar graph representation of a magnitude). The random magnitude would range from zero to the maximum range of the bar graph. If greater the sample value is a 1 and if smaller the value is a 0. The purpose of representing magnitudes in this way is to enhance fuzzy recognition.

Applications

Applications developed for the APM include hand printed character recognition, video compression, stock price prediction based on short-term patterns, and machine vision for high-speed inspection of manufactured products. In the case of hand printed character recognition there are thousands of systems currently installed to automatically read hand-printed information from scanned forms.

There are probably as many applications for the APM as there are for hashing. However, the fuzzy recognition (or fuzzy hashing) offers solutions to an additional class of applications. These applications may relate more to human type pattern recognition for which computers continue to have difficulty (e.g. visual recognition, visual object tracking, continuous speech recognition etc.)

In some embodiments, the present invention provides a first apparatus that includes a current-address unit having a current-address value; a state array operatively coupled to the current-address unit and configured to output data from a state-array location addressed by the current-address value; an input-pattern array operatively coupled to receive the output data from the state array for use as an address in the input-pattern array, wherein the input-pattern array holds data based on an input pattern and is configured to output input-pattern data from a location addressed by the output data from the state array; a next-address unit operatively coupled to the current-address unit and to the input-pattern array, wherein the next-address unit receives the current-address value from the current-address unit and the input-pattern data from the input pattern array and is configured to generate a next-address value based on the received current-address value and the input-pattern data, and to change the current-address value to equal the next-address value; at least a first hash unit configured to generate a first respective hash having a plurality of bits, wherein a value of each of the plurality of bits of the first respective hash is determined by a corresponding respective vertical sensor associated with a predetermined set of addresses of the path for that respective vertical sensor, wherein each respective vertical sensor sets its corresponding bit in the first respective hash based on whether the path includes at least one of the plurality of addresses associated with that respective vertical sensor; and a recognition unit operatively coupled to the first hash unit and configured to output an indication of a recognized pattern in the input pattern based on the first respective hash.

Some embodiments further include a path-recording array that records an indication that the path includes each address used by the path (e.g., an array the size of the state array, wherein when each current address used as an address into the state array is also used to address into the path-recording array, and data (which indicates that this address is on the path corresponding to this input pattern) is stored to each such address in the path-recording array. In some such embodiments, a cycle is detected by reading the previous data before writing the current path's identifier for a given address, and comparing the read data versus the current path's identifier, wherein if these are equal, the path has been here before, and thus a cycle is detected.

In some embodiments, a vertical sensor can be implemented by programming a loop to check each address that is defined as part of each vertical sensor for each bit of a hash, wherein the read data is compared to a cycle identifier, and if equal, the corresponding bit in the corresponding hash is set, else the content of the next address defined to be in this vertical sensor is checked.

In other embodiments, a vertical-sensor array is defined, wherein the number of addressable entries in the vertical-sensor array equals the portion of addresses that could be used for vertical sensors (e.g., in some embodiments, the number of addressable entries in the vertical-sensor array equals the number of addresses in the state array). In some embodiments, each entry in the vertical-sensor array has two portions: a first portion that identifies which hash (if any) uses this address as part of one of its vertical sensors, and a second portion that identifies which bit of that hash (if any) would be set if the path used that address. In some such embodiments, each entry in the vertical-sensor array that is not used for one of the vertical sensors is set to a null value (e.g., all zeros). Thus, in some embodiments, each hash value is initialized to all zeros, and as a path for a particular input pattern is followed (either as a trace or as a cycle), each address generated for the current address into the state array is used as an address into the vertical-sensor array, and the data at that address is read out, and its two portions are used to identify a hash and set one of the bits in that hash. In some embodiments, the hash unit can be thought of as the vertical-sensor array and the set of hashes (i.e., variables used as hashes) that are determined by the APM processor following a path (either trace or cycle).

In some embodiments of the first apparatus, the recognition unit further includes a recognition table configured to receive each respective hash for use as an address location in the recognition table, the recognition unit is configured to load the recognition table during a training mode with a plurality of pattern identifiers corresponding to known patterns, each pattern identifier being loaded into one or more address locations each corresponding to a training hash, wherein the training hash is generated by the hash unit based on one of a plurality of training patterns during the training mode, the recognition table is further configured to output one of the pattern identifiers corresponding to each of one or more hashes during a recognition mode, a first one of the plurality of training patterns is associated with a first training hash and a first pattern identifier, the recognition unit is further configured to load the first pattern identifier into each one of a selected plurality of selected locations of the recognition table during the training mode, each selected address for the selected plurality of address locations is formed by altering a selected subset of one or more bits of the first training hash, thus forming a first plurality of adjacent hashes for the first training hash, wherein each of the first plurality of adjacent hashes is used as an address of a location in the recognition table in which to store the first pattern identifier, the at least one hash unit includes a plurality of hash units, wherein each one of the plurality of hash units generates a respective hash, the recognition unit is operatively coupled to the plurality of hash units and is configured to output a plurality of pattern identifiers, including a respective pattern identifier of a recognized pattern in the input pattern based on each respective hash of the plurality of hashes, and the apparatus further comprises a fuzzy voting unit operatively coupled to the recognition unit and configured to compare the plurality of pattern identifiers and to output a single indication of a recognized pattern in the input pattern based on a frequency of occurrence of each one of the plurality of pattern identifiers. Because similar patterns will generate the same or similar hashes, the fuzzy voting will detect and identify unknown patterns that are similar (the same of similar enough if considered in the fuzzy criteria).

In some embodiments of the first apparatus, each respective vertical sensor has a vertical sensor size, wherein the vertical sensor size is chosen such that a probability that the path includes at least one of the plurality of addresses associated with each respective vertical sensor is about 50%.

In some embodiments of the first apparatus, a maximum difference between the next-address value and the current-address value is about 2A, an average step size is about A, and wherein a size of a set of addresses used for each vertical sensor of the respective hash is about $\log(0.5)/\log((A-1)/A)$.

In some embodiments of the first apparatus, each one of the respective vertical sensors has a vertical sensor size, wherein the vertical sensor size is chosen such that the probability that the path includes at least one of the plurality of addresses associated with each respective vertical sensor is between about 30% and about 70%. In some such embodiments, each one of the respective vertical sensors has a vertical sensor size, wherein the vertical sensor size is chosen such that the probability that the path includes at least one of the plurality of addresses associated with each respective vertical sensor is between about 40% and about 60%. In some such embodiments, each one of the respective vertical sensors has a vertical sensor size, wherein the vertical sensor size is chosen such that the probability that the path includes at least one of the plurality of addresses associated with each respective vertical sensor is between about 45% and about 55%.

In some embodiments of the first apparatus, a maximum difference between the next-address value and the current-address value is about 2A, an average step size is about A, and the plurality of addresses used for each one of the plurality of bits of the respective hash is about $\log(0.5)/\log((A-1)/A)$.

In some embodiments of the first apparatus, the at least one hash unit includes a plurality of hash units each generating a respective hash, each respective hash having a plurality of bits, wherein a value of each bit of each hash is determined by a vertical sensor that determines whether the path includes at least one of a predetermined set of addresses, wherein a maximum difference between the next-address value and the current-address value is about 2A, an average step size is about A, and the set of addresses used for determining each bit of the respective hash includes about $\log(0.5)/\log((A-1)/A)$ addresses.

In some embodiments of the first apparatus, the next-address unit further includes a plurality of next-address arrays that are operatively coupled to use the input-pattern data from the input-pattern array to select a selected one of the plurality of next-address arrays that is operatively coupled to use the current-address value from the current-address unit to select a selected location in the selected one of the plurality of next-address arrays, and that is configured to output a next-address-increment value from the selected location; and a first adder unit operatively coupled to receive the next-address-increment value from the next-address arrays and operatively coupled to receive the current-address value from the current-address unit, wherein the adder unit is configured to add the next-address-increment value to the current-address value to generate the next-address value.

In some embodiments of the first apparatus, the recognition unit further comprises a recognition table configured to receive each respective hash for use as an address location in the recognition table, the recognition unit is configured to load the recognition table during a training mode with a plurality of pattern identifiers corresponding to known patterns, each pattern identifier being loaded into one or more address locations each corresponding to a training hash, wherein the training hash is generated by the hash unit based on one of a plurality of training patterns during a training mode, and the recognition table is further configured to output one of the pattern identifiers corresponding to each of one or more hashes during a recognition mode.

In some embodiments of the first apparatus, a first one of the plurality of training patterns is associated with a first training hash and a first pattern identifier, the recognition unit is further configured to load the first pattern identifier into each one of a selected plurality of selected locations of the recognition table during the training mode, and each selected address for the selected plurality of address locations is formed by altering a selected subset of one or more bits of the first training hash, thus forming a first plurality of adjacent hashes for the first training hash, wherein each of the first plurality of adjacent hashes is used as an address of a location in the recognition table in which to store the first pattern identifier.

In some embodiments of the first apparatus, the at least one hash unit includes a plurality of hash units, wherein each one of the plurality of hash units generates a respective hash, and the recognition unit is operatively coupled to the plurality of hash units and is configured to output a plurality of pattern identifiers, including a respective pattern identifier of a recognized pattern in the input pattern based on each respective hash of the plurality of hashes. Some embodiments further include a fuzzy voting unit operatively coupled to the recognition unit and configured to compare the plurality of pattern identifiers and to output a single indication of a recognized pattern in the input pattern based on a frequency of occurrence of each one of the plurality of pattern identifiers.

In some embodiments of the first apparatus, a maximum difference between the next-address value and the current-address value is about 255, and the set of addresses used for each respective bit of the respective hash is 88 addresses.

In some embodiments, the present invention provides a first method that includes storing a current-address value; storing input-pattern-array addresses in a state array; outputting input-pattern-selection data from a location in the state array addressed by the current-address value; holding data based on an input pattern in an input-pattern array; outputting an input-pattern address from a location in the input-pattern array addressed by the input-pattern-selection data from the state array; generating a next-address value based on the current-address value and the input-pattern-selection data, and changing the current-address value to equal the next-address value; recording a succession of addresses that define a path associated with the input pattern; generating at least one respective hash having a plurality of bits, wherein each one of the plurality of bits is associated with a set of a predetermined set of addresses, and wherein a value of each of the plurality of bits of the respective hash is determined by whether the path includes at least one of the predetermined set of addresses associated with that respective bit; and during a recognition mode, outputting at least one pattern identifier of a recognized pattern in the input pattern based on the at least one respective hash.

Some embodiments of the first method further include during a training mode, loading a pattern-recognition table with a plurality of pattern identifiers corresponding to known patterns, wherein the loading includes loading each pattern identifier into one or more address locations, each address location corresponding to a training hash, wherein the training hash is generated based on one of a plurality of training patterns, wherein the plurality of training patterns includes a first training pattern, wherein a first pattern identifier is associated with the first training pattern, and wherein the loading includes: generating a first training hash from the first training pattern, forming a first plurality of adjacent hashes for the first training hash by altering different selected subsets of hash bits of the first training hash, each subset having one or more bits, using each one of the first plurality of adjacent hashes as an address of a respective location in the recognition table and storing the first pattern identifier into the respective location, wherein the generating of the at least one hash includes generating a plurality of hashes, wherein the outputting of the at least one pattern identifier includes outputting a plurality of pattern identifiers, each one of the plurality of pattern identifiers based on a corresponding one of the plurality of hashes, wherein the outputting of the at least one pattern identifier further comprises outputting a plurality of pattern identifiers by using each one of the plurality of hashes as an address to a location in the pattern-recognition table, and outputting a pattern identifier fetched from the address location; and wherein the method further comprises comparing the outputted plurality of pattern identifiers and generating an indication of a recognized pattern in the input pattern based on a frequency of occurrence of each one of the plurality of pattern identifiers.

In some embodiments of the first method, a size of the set of the predetermined set of addresses for each bit is chosen such that a probability that the path includes at least one of the plurality of addresses associated with the bit is about 50%.

In some embodiments of the first method, a maximum difference between the next-address value and the current-address value is about 2A, an average step size is about A, and a size of the set of the predetermined set of addresses used for each one of the plurality of bits of the respective hash is about $\log(0.5)/\log((A-1)/A)$.

In some embodiments of the first method, each one of the respective vertical sensors has a vertical sensor size, wherein the vertical sensor size is chosen such that the probability that the path includes at least one of the plurality of addresses associated with each respective vertical sensor is between about 30% and about 70%. In some such embodiments, each one of the respective vertical sensors has a vertical sensor size, wherein the vertical sensor size is chosen such that the probability that the path includes at least one of the plurality of addresses associated with each respective vertical sensor is between about 40% and about 60%. In some such embodiments, each one of the respective vertical sensors has a vertical sensor size, wherein the vertical sensor size is chosen such that the probability that the path includes at least one of the plurality of addresses associated with each respective vertical sensor is between about 45% and about 55%.

In some embodiments of the first method, a maximum difference between the next-address value and the current-address value is about 2A, an average step size is about A, and the plurality of addresses used for each one of the plurality of bits of the respective hash is about $\log(0.5)/\log((A-1)/A)$.

In some embodiments of the first method, the at least one hash unit includes a plurality of hash units each generating a respective hash, each respective hash having a plurality of bits, wherein a value of each bit of each hash is determined by a vertical sensor that determines whether the path includes at least one of a predetermined set of addresses, wherein a maximum difference between the next-address value and the current-address value is about 2A, an average step size is about A, and the set of addresses used for determining each bit of the respective hash includes about $\log(0.5)/\log((A-1)/A)$ addresses.

In some embodiments of the first method, the generating of the next-address value further includes providing a plurality of next-address arrays; using the input-pattern data from the input-pattern array to select a selected one of the plurality of next-address arrays, and using the current-address value from the current-address unit to select a selected location in the selected one of the plurality of next-address arrays, and outputting a next-address-increment value from the selected location; and adding the next-address-increment value to the current-address value to generate the next-address value.

Some embodiments further include providing a recognition table; during a training mode:
generating a respective training hash based on each one of a plurality of training patterns, and loading the recognition table with a plurality of pattern identifiers corresponding to known patterns, each pattern identifier being loaded into one or more address locations each corresponding to the respective training hashes, and during the recognition mode: the outputting of the at least one pattern identifier further comprises using each of the at least one respective hash as an address location in the recognition table, and outputting from the recognition table the pattern identifier corresponding to each one of the one or more hashes.

In some embodiments of the first method, the one or more address locations corresponding to each respective training hash includes a plurality of address locations corresponding to each respective training hash, wherein a first one of the plurality of training patterns is associated with a first training hash and a first pattern identifier, the loading of the recognition table further includes loading the first pattern identifier into each one of a selected plurality of selected locations of the recognition table during the training mode by altering different selected subsets of one or more bits of the first training hash, thus forming a first plurality of adjacent hashes for the first training hash, and using each of the first plurality of adjacent hashes as an address of a location in the recognition table in which to store the first pattern identifier.

In some embodiments of the first method, the generating of the at least one respective hash includes generating a plurality of respective hashes, and wherein the outputting of the at least one pattern identifier includes outputting a plurality of pattern identifiers including a respective pattern identifier of a recognized pattern in the input pattern based on each respective hash of the plurality of respective hashes.

Some embodiments of the first method further include generating a count of each different identifier among the plurality of pattern identifiers and outputting an indication of a recognized pattern in the input pattern based on a frequency of occurrence of each one of the plurality of pattern identifiers.

In some embodiments of the first method, a maximum difference between the next-address value and the current-address value is about 255, and the set of addresses used for each respective bit of the respective hash is 88 addresses.

In some embodiments, the present invention provides a second apparatus that includes a current-address unit having a current-address value; a state array operatively coupled to the current-address unit and configured to receive the current-address value from the current-address unit into a state-array location and configured to output data from the state-array location addressed by the current-address value, wherein a plurality of state-array locations addressed by the current-address value forms a path through the state-array; an input-pattern array operatively coupled to receive the output data from the state array for use as an address in the input-pattern array, wherein the input-pattern array holds data based on an input pattern and is configured to output input-pattern data from a location addressed by the output data from the state array; a next-address unit operatively coupled to the current-address unit and to the input-pattern array, wherein the next-address unit receives the current-address value from the current-address unit and the input-pattern data from the input pattern array and is configured to generate a next-address value based on the received current-address value and the input-pattern data, and to change the current-address value to equal the next-address value; and a recognition unit that uses addresses of the path that are beyond a trace boundary to define a trace having trace addresses formed from the plurality of state-address locations located beyond the trace boundary.

Some embodiments of the second apparatus further include, a trace unit operatively coupled to the current-address unit and configured to receive the current-address value from the current-address unit into a trace-array location of a trace array after the path has traversed beyond the trace boundary, wherein the plurality of trace-array locations in the trace array forms the trace, and a recognition unit configured to receive the trace from the trace unit and to output an indication of a recognized pattern in the input pattern based on the trace.

In some embodiments of the second apparatus, the trace boundary is chosen such that a probability that the trace addresses are included on the path is greater than about 80%. In some such embodiments, the trace boundary is chosen such that the probability that the trace addresses are included on the path is greater than about 85%. In some such embodiments, the trace boundary is chosen such that the probability that the trace addresses are included on the path is greater than about 90%. In some such embodiments, the trace boundary is chosen such that the probability that the trace addresses are included on the path is greater than about 95%. In some such embodiments, the trace boundary is chosen such that the probability that the trace addresses are included on the path is greater than about 98%. In some such embodiments, the trace boundary is chosen such that the probability that the trace addresses are included on the path is greater than about 99%.

In some embodiments of the second apparatus, a maximum difference between the next-address value and the current-address value is about 2A, an average step size is about A, and the trace boundary is chosen such that a number steps traversed through the state array is about $\log(0.05)/\log((A-1)/$ A) and a number of addresses traversed through the state array is about $A*\log(0.05)/\log((A-1)/A)$.

In some embodiments of the second apparatus, the next-address unit further includes a plurality of next-address arrays that are operatively coupled to use the input-pattern data from the input-pattern array to select a selected one of the plurality of next-address arrays that is operatively coupled to use the current-address value from the current-address unit to select a selected location in the selected one of the plurality of next-address arrays, and that is configured to output a next-address-increment value from the selected location; and a first adder unit operatively coupled to receive the next-address-increment value from the next-address arrays and operatively coupled to receive the current-address value from the current-address unit, wherein the adder unit is configured to add the next-address-increment value to the current-address value to generate the next-address value.

In some embodiments of the second apparatus, the recognition unit further comprises a recognition table configured to receive the trace addresses for each trace from the trace unit for use as an address location in the recognition table, the recognition unit is configured to load the recognition table during a training mode with a plurality of pattern identifiers corresponding to known patterns, each pattern identifier being loaded into one or more address locations each corresponding to a trace, wherein the trace is generated by the trace unit based on one of a plurality of training patterns during a training mode, and the recognition table is further configured to output one of the pattern identifiers corresponding to each of one or more traces during a recognition mode.

In some embodiments of the second apparatus, a maximum difference between the next-address value and the current-address value is about 256, and the trace boundary is chosen such that about 382 steps are traversed through the state array and about 48,896 addresses are traversed through the state array.

Some embodiments of the second apparatus further include, at least a first hash unit configured to generate a first respective hash having a plurality of bits, wherein a value of each of the plurality of bits of the first respective hash is determined by a corresponding respective vertical sensor associated with a predetermined set of addresses of the trace for that respective vertical sensor, wherein each respective vertical sensor sets its corresponding bit in the first respective hash based on whether the trace includes at least one of the plurality of addresses associated with that respective vertical sensor; and a recognition unit operatively coupled to the first hash unit and configured to output an indication of a recognized pattern in the input pattern based on the first respective hash.

In some such embodiments, a first one of the plurality of training patterns is associated with a first training hash and a first pattern identifier, the recognition unit is further configured to load the first pattern identifier into each one of a selected plurality of selected locations of the recognition table during the training mode, and each selected address for the selected plurality of address locations is formed by altering a selected subset of one or more bits of the first training hash, thus forming a first plurality of adjacent hashes for the first training hash, wherein each of the first plurality of adjacent hashes is used as an address of a location in the recognition table in which to store the first pattern identifier.

In some other such embodiments of the first apparatus, the at least one hash unit includes a plurality of hash units, wherein each one of the plurality of hash units generates a respective hash, and the recognition unit is operatively coupled to the plurality of hash units and is configured to output a plurality of pattern identifiers, including a respective pattern identifier of a recognized pattern in the input pattern based on each respective hash of the plurality of hashes. Some embodiments further include a fuzzy voting unit operatively coupled to the recognition unit and configured to compare the plurality of pattern identifiers and to output a single indication of a recognized pattern in the input pattern based on a frequency of occurrence of each one of the plurality of pattern identifiers.

In some embodiments, the present invention provides a second method that includes storing a current-address value; storing input-pattern-array addresses in a state array; outputting input-pattern-selection data from a location in the state array addressed by the current-address value; holding data based on an input pattern in an input-pattern array; outputting an input-pattern address from a location in the input-pattern array addressed by the input-pattern-selection data from the state array; generating a next-address value based on the current-address value and the input-pattern-selection data, and changing the current-address value to equal the next-address value; using a succession of addresses located beyond a trace boundary that define a respective trace associated with the input pattern to obtain a pattern identifier associated with the input pattern.

Some embodiments of the second method further include, holding the succession of addresses in a trace array, and during a recognition mode, outputting at least one pattern identifier of a recognized pattern in the input pattern based on the respective trace.

In some embodiments of the second method, the trace boundary is chosen such that a probability that the trace addresses are included on the path is greater than about 80%. In some such embodiments, the trace boundary is chosen such that the probability that the trace addresses are included on the path is greater than about 85%. In some such embodiments, the trace boundary is chosen such that the probability that the trace addresses are included on the path is greater than about 90%. In some such embodiments, the trace boundary is chosen such that the probability that the trace addresses are included on the path is greater than about 95%. In some such embodiments, the trace boundary is chosen such that the probability that the trace addresses are included on the path is greater than about 98%. In some such embodiments, the trace boundary is chosen such that the probability that the trace addresses are included on the path is greater than about 99%.

In some embodiments of the second method, a maximum difference between the next-address value and the current-address value is about 2A, an average step size is about A, and the trace boundary is chosen such that a number steps traversed through the state array is about $\log(0.05)/\log((A-1)/A)$ and a number of addresses traversed through the state array is about $A*\log(0.05)/\log((A-1)/A)$.

In some embodiments of the second method, the generating of the next-address value further includes providing a plurality of next-address arrays; using the input-pattern data from the input-pattern array to select a selected one of the plurality of next-address arrays, and using the current-address value from the current-address unit to select a selected location in the selected one of the plurality of next-address arrays, and outputting a next-address-increment value from the selected location; and adding the next-address-increment value to the current-address value to generate the next-address value.

Some embodiments further include providing a recognition table; during a training mode:
generating a respective training trace based on each one of a plurality of training patterns, and loading the recognition table with a plurality of pattern identifiers corresponding to known patterns, each pattern identifier being loaded into one or more address locations each corresponding to the respective training trace, and during the recognition mode: the outputting of the at least one pattern identifier further comprises using each of the at least one respective trace as an address location in the recognition table, and outputting from the recognition table the pattern identifier corresponding to each of one or more respective traces.

In some embodiments of the second method, a maximum difference between the next-address value and the current-address value is about 256, and the trace boundary is chosen such that about 382 steps are traversed through the state array and about 48,896 addresses are traversed through the state array.

Some embodiments of the second method further include, generating at least one respective hash having a plurality of bits, wherein each one of the plurality of bits is associated with a set of a predetermined set of addresses, and wherein a value of each of the plurality of bits of the respective hash is determined by whether the respective trace includes at least one of the predetermined set of addresses associated with that respective bit; and during a recognition mode, outputting at least one pattern identifier of a recognized pattern in the input pattern based on the at least one respective hash.

In some such embodiments, the at least one hash unit has a plurality of hash units each generating a respective hash, each respective hash having a plurality of bits, wherein a value of each bit of each hash is determined by a vertical sensor that determines whether the path includes at least one of a predetermined set of addresses, wherein a maximum difference between the next-address value and the current-address value is about 2A, an average step size is about A, and the set of addresses used for determining each bit of the respective hash includes about $\log(0.5)/\log((A-1)/A)$ addresses.

In some embodiments of the second method, the generating of the at least one respective hash includes generating a plurality of respective hashes, and wherein the outputting of the at least one pattern identifier includes outputting a plurality of pattern identifiers including a respective pattern identifier of a recognized pattern in the input pattern based on each respective hash of the plurality of respective hashes.

Some embodiments of the second method further include generating a count of each different identifier among the plurality of pattern identifiers and outputting an indication of a recognized pattern in the input pattern based on a frequency of occurrence of each one of the plurality of pattern identifiers.

Image Pre-Processing

In some embodiments, the present invention provides a third apparatus that includes a current-address unit having a current-address value; a state array operatively coupled to the current-address unit and configured to output data from a state-array location addressed by the current-address value, an input-pattern-pre-processing unit operatively coupled to an input-pattern array and configured to receive an input pattern and to output a pre-processed-input pattern, wherein the input-pattern array holds the pre-processed-input pattern, wherein the input-pattern array is operatively coupled to receive the output data from the state array for use as an address in the input-pattern array, and is configured to output pre-processed-input-pattern data from a location addressed by the output data from the state array; a next-address unit operatively coupled to the current-address unit and to the input-pattern array, wherein the next-address unit receives the current-address value from the current-address unit and the pre-processed-input-pattern data from the input-pattern array and is configured to generate a next-address value based on the received current-address value and the pre-processed-input-pattern data, and to change the current-address value to equal the next-address value; and a recognition unit operatively coupled to the current-address unit and configured to output an indication of a recognized pattern in the input pattern.

Some such embodiments of the third apparatus further include at least a first hash unit configured to generate a first respective hash having a plurality of bits, wherein a value of each of the plurality of bits of the first respective hash is determined by a corresponding respective vertical sensor associated with a predetermined set of addresses of a path for that respective vertical sensor, wherein each respective vertical sensor sets its corresponding bit in the first respective hash based on whether the path includes at least one of the plurality of addresses associated with that respective vertical sensor; and a recognition unit operatively coupled to the first hash unit and configured to output an indication of a recognized pattern in the input pattern based on the first respective hash.

In some embodiments of the third apparatus, the input-pattern-pre-processing unit locates recognized features or patterns in the input pattern and outputs data based on the recognized features or patterns into the input-pattern array. That is, the input-pattern-pre-processing unit identifies specific features or patterns (e.g., edges, enclosed areas, connected areas, distinguishing marks and geometries) in the input pattern.

In some such embodiments, the input-pattern-pre-processing unit adds weighting based on the importance of the recognized features or patterns in the input pattern. That is, the input-pattern-pre-processing unit provides weighting data based on the importance of the recognized features or patterns such that important recognized features or patterns are sampled more frequently than less important recognized features or patterns.

In some embodiments of the third apparatus, the input-pattern-pre-processing unit outputs a grey-scale-fuzzy-magnitude-input pattern based on the input pattern. That is, the input-pattern-pre-processing unit first determines a grey-scale-input pattern based on the input pattern, whereby each pixel of the input pattern corresponds to a respective location in the grey-scale-input pattern and the value of the respective location is a number that correspond to the grey-scale magnitude, having a particular range, of the pixel. The input-pattern-pre-processing unit next generates a grey-scale-fuzzy-magnitude-input pattern wherein the values in the locations in the grey-scale-fuzzy-magnitude-input pattern have a range of grey-scale magnitudes that are centered on the respective values in the respective locations in the grey-scale-input pattern. For example, in some embodiments, if the grey-scale value in the respective location of the grey-scale-input pattern is 7, then the value if the location of the grey-scale-fuzzy-magnitude-input pattern will be a range from 6 to 8. In some other embodiments, the input-pattern-pre-processing unit provides a grey-scale-fuzzy-magnitude-input pattern for locations that have a specific value.

In some embodiments, the present invention provides a third method that performs a series of operations corresponding to the operation of the third apparatus.

Some Application Categories Include:

Signal Processing Using Vector Quantization

Vector quantization is widely used for signal processing and compression. The most difficult part of its implementation is creating the codebook and searching the codebook for a match. Because of fuzzy recognition, the APM process can automatically create the codebook and match entries in the codebook without searching.

Video Images

In some embodiments, the present invention provides an apparatus and/or method for handling tasks involving visual images using video cameras include object tracking, object recognition, compression, smart surveillance, stereovision for depth perception etc. Most of these tasks relate to matching segments of an image either from frame to frame for motion or camera to camera for stereovision. In some embodiments, the present invention provides a low-level APM processing of the individual video frames and/or audio segments, and then performs one or more recursive higher-level APM processing of sequences of the now-processed individual frames. In some embodiments, each subportion (e.g., each 8-by-8 pixel block from a much larger image) can be recognized in each of two or more images, and the optical flow of each recognized subportion is recognized or identified by higher-level processing. In other embodiments, each of two or more stereo images are processed at a lower level, and then higher-level APM processing of the subportions are processed to obtain depth and/or other information from the stereo images.

Content-Addressable Image Databases

In some embodiments, the present invention includes an apparatus and/or method of creating and accessing image databases where image content is the search category rather than text, labels or indices. In some embodiments, the present invention can be used for image searches on the Internet where an image is the search element rather than text. In some embodiments, the pattern identifier obtained by APM processing of a newly entered input image is used to point to one or more previously entered images (either during a training mode or during APM processing of earlier-entered input images) that, based on fuzzy voting and/or other techniques, have been determined to be similar to the newly entered input image.

In some embodiments, such as shown in FIG. 6, the present invention includes the above-described first apparatus and/or method that use vertical sensors to generate hash codes of the path taken. Some embodiments further include using fuzzy hash voting. In some such embodiments, the present invention fills a plurality of locations in a recognition table with a pattern identifier associates with a particular training pattern, wherein these locations have adjacent hash addresses derived from the training hash associated with the training pattern.

In some embodiments, such as shown in FIG. 10, the present invention includes the above-described second method that includes using a trace boundary to identify a portion of a path that can be used to identify a particular pattern with a given confidence or probability. This portion of the path is called a trace, and is distinguished from a cycle in that a cycle must follow the path from the end of its state array and path-recording array through the beginning of the path-recording array and continuing until a previously recorded address for this cycle is encountered in the path recording array.

In contrast to a cycle, a trace merely needs to follow a set of addresses in the path until the trace boundary in the state array is exceeded. The path can be but need not be recorded for the trace. The trace boundary is an address that is determined by an analysis of the probability that a given series of state-array addresses (each of which has provided data used as a pointer or address into the input array to fetch a sample of the input data) will have joined a path that is identical to the path followed by a cycle if the input data were analyzed by the same state array and next-address-generation logic and data to detect a cycle In some embodiments, no path-recording array is used, but rather a vertical-sensor array is used, wherein each location in the vertical-sensor array contains a pair of numbers: an index (address or indicator) selecting one of the one or more hash codes and an index of one of the bits in that hash code (specifying the bit position that is to be set if this address is in the path). In some embodiments, a single hash is used, and in some such embodiments, only the bit position specifier is kept in each location of the vertical-sensor array. When the current address or next address of the state array uses a particular address, the same location in the vertical-sensor array is read, and the two indexes in that location are used so specify the hash and the bit in that hash that is to be set. Note that the term "set" in this context can be to set a particular bit to one if all hash bits are initialized to zero, or to set the particular bit to zero if all bits in the hash are initialized to ones. In some embodiments, the state array is made large enough and the trace through the path is followed (through the state array and thus through the vertical-sensor array) until a sufficient number of addresses are traversed in order to be able to use the trace to generate a hash of that trace that is distinct from hashes of other traces derived from other patterns to a given desired probability of distinction (to spread the distribution of hashes). In some such embodiments, vertical sensors for each bit of a hash include only addresses that exceed the trace boundary (addresses that are larger than a predetermined number). In some such embodiments, a plurality of hashes each generated using a plurality of vertical sensors are all generated using vertical sensors on addresses that exceed the trace boundary.

In some embodiments, such as shown in FIG. 8, the present invention includes the above-described third apparatus and/or method that include pre-processing an input pattern to generate grey-scale fuzzy magnitudes to be recognized as portions of the input pattern. In some such embodiments, each value (from the initial or pre-processed input data pattern) for which a fuzzy magnitude is desired has a series of ones filled in (in the input-pattern array) followed by a series of zeros, wherein the number of ones corresponds to the magnitude of the actual value and the number of zeros corresponds to the difference between the maximum possible value and the actual value. Suppose the input data has a pair of numbers, three and nine. For example, if the maximum possible value is ten, and the actual value is three, three ones followed by seven zeros is placed in the input-pattern array. Similarly, if the maximum possible value is ten, and the actual value is nine, nine ones followed by one zero is placed in the input-pattern array. The spread (e.g., random) sampling is then more likely to recognize another pair of values 4 and 8 as matching (under the fuzzy recognition) that it would be to match a pair of values 1 and 5. The second pair of numbers just needs to be close, but need not be exactly identical, in order to produce the same hash or a substantially similar hash.

In some embodiments, the invention includes the above-described third apparatus and/or method that use image-data pre-processing to create feature sets of pre-process recognized features or patterns (e.g., edges, enclosed areas, connected areas, isolated areas, and the like in images; frequency content, loudness envelopes, and the like in audio or video input content). In some such embodiments, the present invention provides weighting of the pre-processed features or patterns by repeating different numbers of the features or patterns in the input data used in the associative pattern memory, in order that those features become more or less important that other features in the input data. For example, if one quadrant of a set of input images is five times more important in distinguishing different patterns than are the other three quadrants, the preprocessing of the image can include providing five copies of the important quadrant and only one copy each of the other three quadrants. The present invention, by using spread/random sampling, will typically sample pixels in the important quadrant five times as often as pixels in the other three quadrants.

In some embodiments, such as shown in FIG. 7A and FIG. 9, the present invention includes a fourth apparatus and/or method that include generating one or more series of recognized patterns identifiers, vertical-sensor bits or sets of hash codes from input data (this initial series or sets of hash codes are called the low level recognition, and for example might correspond to individual handwritten letters in a hand-written manuscript or individual sounds (e.g., phonemes) in a recording of human voice), and generating a secondary input array that includes the one or more bits from the vertical sensors, or series of pattern identifiers of recognized low-level patterns, or sets of hash codes from the low level recognition, and the present invention then searches for patterns among the hash codes (for example, this might correspond to recognizing words or sentences from the earlier recognized individual handwritten letters, or might correspond to recognized words or sentences recognized from the series of phonemes in the voice recording), in order to provide recursive pattern recognition of spatial, frequency and/or temporal sequence patterns in the low-level recognized patterns (e.g., time sequences, frequency sequences, successive letters or words, different portions of a photograph or other image).

In some embodiments, as shown in FIG. 3, the present invention includes an apparatus and method of input pattern normalization and optionally uses a separate incrementer to accommodate the normalization. In such some embodiments, the present invention provides a method and/or apparatus that includes a current-address unit having a current-address value; a state array operatively coupled to the current-address unit and configured to output data from a state-array location addressed by the current-address value; an input-pattern array operatively coupled to receive the output data from the state array for use as an address in the input-pattern array, wherein the input-pattern array holds data based on an input pattern and is configured to output input-pattern data from a location addressed by the output data from the state array; a next-address unit operatively coupled to the current-address unit and to the input-pattern array, wherein the next-address unit receives the current-address value from the current-address unit and a first sum that is in part based on a value of the input-pattern data from the input pattern array and in part on a value of the data from the input pattern array and is configured to generate a next-address value based on a second sum of the received current-address value and the first sum, and to change the current-address value to equal the next-address value; at least a first hash unit configured to generate a first respective hash having a plurality of bits, wherein a value of each of the plurality of bits of the first respective hash is determined by a corresponding respective vertical sensor associated with a predetermined set of addresses of the path for that respective vertical sensor, wherein each respective vertical sensor sets its corresponding bit in the first respective hash based on whether the path includes at least one of the plurality of addresses associated with that respective vertical sensor; and a recognition unit operatively coupled to the first hash unit and configured to output an indication of a recognized pattern in the input pattern based on the first respective hash.

Figure 11:
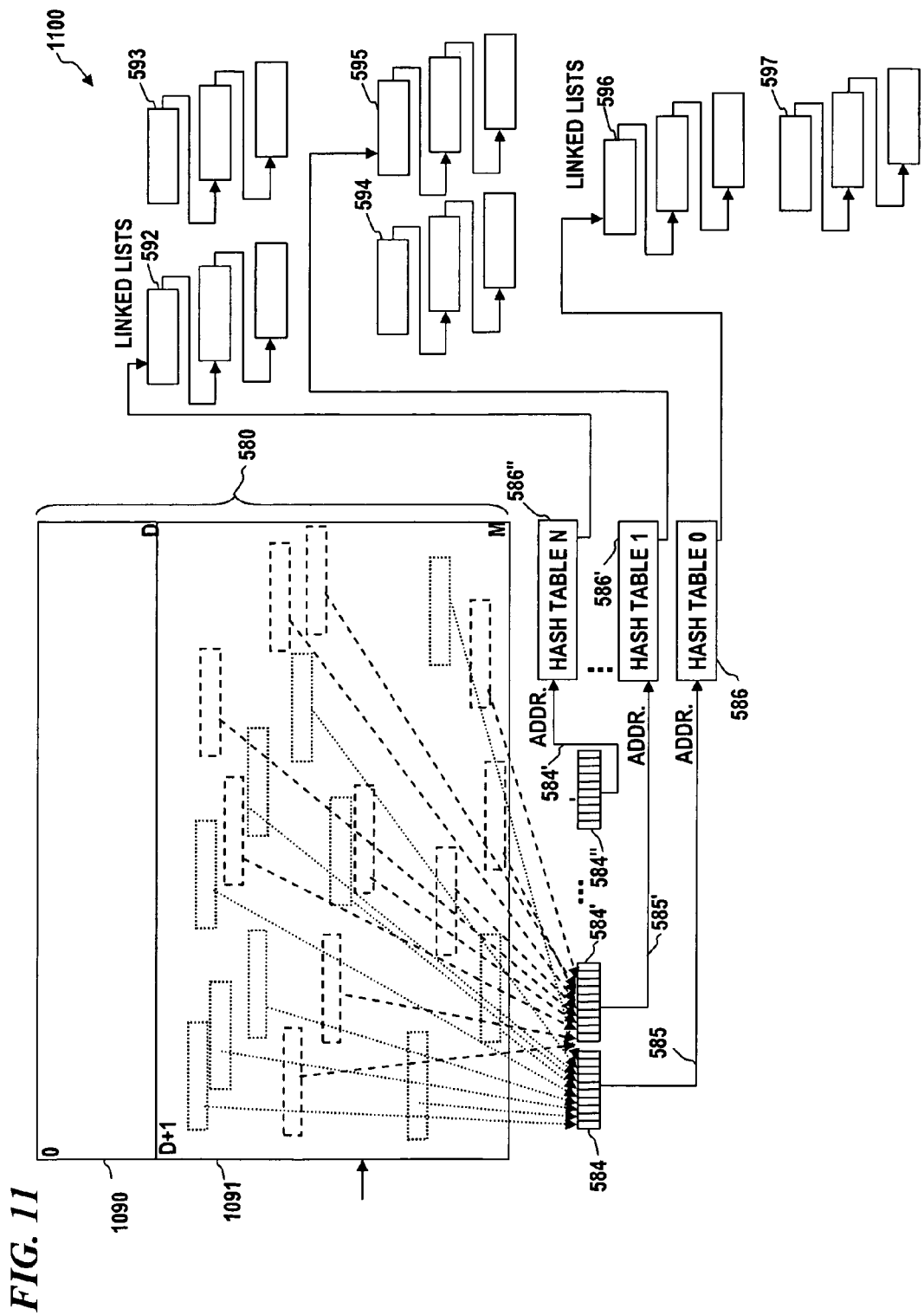
FIG. 11 is a block diagram of a vertical sensor system 1100, according to some embodiments of the present invention, which implements linked lists that can be used as a form of content-addressable memory.

In some embodiments, such as shown in FIG. 11, the present invention includes hash tables (e.g. 586, 586' through 586") that contain links to different linked lists (e.g., 592, 593, 594, 595, 596, 597), each linked list containing various recognition data relevant to similar patterns. For example, the training might input a plurality of training images of a particular celebrity, such as, for example, Kylie Minogue. During training, a linked list of these training images is generated, and the linked list is connected to one or more entries in each one of a plurality of hash tables (e.g., each hash table having one or more entries (e.g., at a plurality of adjacent hash addresses to each training hash) each of which points to the linked list of the training images of Kylie Minogue). If later, during recognition mode, an input image that looks similar to Kylie Minogue generates a hash, that hash is input to a hash table, and that hash table outputs a link or pointer to the linked list, each member of which is a different image of Kylie Minogue. In other embodiments, the fuzzy voting box can output a link to one of the linked lists of patterns. Thus, in some embodiments, the present invention provides a content-addressable image memory can be looked up using the fuzzy voting or a plurality of hash tables each optionally including adjacent-hash entries. The linked lists optionally include a plurality of similar training data patterns (e.g., in some embodiments, each linked list includes only images that are "similar" as determined by the APM software and/or by a person classifying and/or identifying the images during a training mode).

In some embodiments, the present invention thus provides an apparatus and/or method comprising cycle or trace detections in an associative pattern memory (APM), optionally including vertical sensors, amplitude sampling, adjacent hashes and/or fuzzy hashes. Thus, in some embodiments, the present invention is used for pattern recognition using cycles or traces in an associative pattern memory (APM), optionally using vertical sensors, amplitude sampling, adjacent hashes and/or fuzzy hashes.

In some embodiments, the present invention provides combinations and sub-combinations of the various routines, methods and apparatuses that add or remove individual features of the above-described apparatuses and methods to form different combinations and sub-combinations of the present invention.

It is to be understood that the above description is intended to be illustrative, and not restrictive. Although numerous characteristics and advantages of various embodiments as described herein have been set forth in the foregoing description, together with details of the structure and function of various embodiments, many other embodiments and changes to details will be apparent to those of skill in the art upon reviewing the above description. The scope of the invention should be, therefore, determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. An apparatus comprising:
   a current-address unit having a current-address value;
   a state array operatively coupled to the current-address unit and configured to output data from a state-array location addressed by the current-address value;
   an input-pattern array operatively coupled to receive the output data from the state array for use as an address in the input-pattern array, wherein the input-pattern array holds data based on an input pattern and is configured to output input-pattern data from a location addressed by the output data from the state array;

a next-address unit operatively coupled to the current-address unit and to the input-pattern array, wherein the next-address unit receives the current-address value from the current-address unit and the input-pattern data from the input pattern array and is configured to generate a next-address value based on the received current-address value and the input-pattern data, and to change the current-address value to equal the next-address value;

at least a first hash unit configured to generate a first respective hash having a plurality of bits, wherein a value of each of the plurality of bits of the first respective hash is determined by a corresponding respective vertical sensor associated with a predetermined set of addresses of the path for that respective vertical sensor, wherein each respective vertical sensor sets its corresponding bit in the first respective hash based on whether the path includes at least one of the plurality of addresses associated with that respective vertical sensor; and a recognition unit operatively coupled to the first hash unit and configured to output an indication of a recognized pattern in the input pattern based on the first respective hash.

2. The apparatus of claim 1, wherein the recognition unit further comprises a recognition table configured to receive the first respective hash for use as an address location in the recognition table, wherein the recognition unit is configured to load the recognition table during a training mode with a plurality of pattern identifiers each corresponding to a respective training pattern, each pattern identifier being loaded into a selected plurality of address locations each corresponding to a training hash, wherein the training hash is generated by the hash unit based on one of a plurality of training patterns during the training mode, wherein each selected address for the selected plurality of address locations is formed by altering a selected subset of one or more bits of the first training hash, thus forming a first plurality of adjacent hashes for the first training hash, wherein each of the first plurality of adjacent hashes is used as an address of a location in the recognition table in which to store the first pattern identifier, wherein a first one of the plurality of training patterns is associated with a first training hash and a first pattern identifier, wherein the at least one hash unit includes a plurality of hash units, wherein each one of the plurality of hash units generates a respective hash, wherein the recognition table is operatively coupled to the plurality of hash units and is configured to output a plurality of pattern identifiers, including a respective pattern identifier of a recognized pattern in the input pattern based on each respective hash of the plurality of hashes, and wherein the apparatus further comprises a fuzzy voting unit operatively coupled to the recognition table and configured to compare the plurality of pattern identifiers and to output a single indication of a recognized pattern in the input pattern based on a frequency of occurrence of each one of the plurality of pattern identifiers.

3. The apparatus of claim 1, wherein each respective vertical sensor has a vertical sensor size, wherein the vertical sensor size is chosen such that a probability that the path includes at least one of the plurality of addresses associated with each respective vertical sensor is about 50%.

4. The apparatus of claim 1, wherein a maximum difference between the next-address value and the current-address value is about 2A, an average step size is about A, and wherein a size of a set of addresses used for each vertical sensor of the respective hash is about $\log(0.5)/\log((A-1)/A)$.

5. The apparatus of claim 1, wherein the next-address unit further comprises:

a plurality of next-address arrays that are operatively coupled to use the input-pattern data from the input-pattern array to select a selected one of the plurality of next-address arrays that is operatively coupled to use the current-address value from the current-address unit to select a selected location in the selected one of the plurality of next-address arrays, and that is configured to output a next-address-increment value from the selected location; and a first adder unit operatively coupled to receive the next-address-increment value from the next-address arrays and operatively coupled to receive the current-address value from the current-address unit, wherein the adder unit is configured to add the next-address-increment value to the current-address value to generate the next-address value.

6. The apparatus of claim 1, wherein the recognition unit further comprises a recognition table configured to receive each respective hash for use as an address location in the recognition table, wherein the recognition unit is configured to load the recognition table during a training mode with a plurality of pattern identifiers corresponding to known patterns, each pattern identifier being loaded into one or more address locations each corresponding to a training hash, wherein the training hash is generated by the hash unit based on one of a plurality of training patterns during a training mode, and wherein the recognition table is further configured to output one of the pattern identifiers corresponding to each of one or more hashes during a recognition mode.

7. The apparatus of claim 6, wherein a first one of the plurality of training patterns is associated with a first training hash and a first pattern identifier, wherein the recognition unit is further configured to load the first pattern identifier into each one of a selected plurality of selected locations of the recognition table during the training mode, and wherein each selected address for the selected plurality of address locations is formed by altering a selected subset of one or more bits of the first training hash, thus forming a first plurality of adjacent hashes for the first training hash, wherein each of the first plurality of adjacent hashes is used as an address of a location in the recognition table in which to store the first pattern identifier.

8. The apparatus of claim 1, wherein the at least one hash unit includes a plurality of hash units, wherein each one of the plurality of hash units generates a respective hash, and wherein the recognition unit is operatively coupled to the plurality of hash units and is configured to output a plurality of pattern identifiers, including a respective pattern identifier of a recognized pattern in the input pattern based on each respective hash of the plurality of hashes.

9. The apparatus of claim 8, further comprising a fuzzy voting unit operatively coupled to the recognition unit and configured to compare the plurality of pattern identifiers and to output a single indication of a recognized pattern in the input pattern based on a frequency of occurrence of each one of the plurality of pattern identifiers.

10. The apparatus of claim 1, wherein a maximum difference between the next-address value and the current-address value is about 256, and the set of addresses used for each respective bit of the respective hash is 88 addresses.

11. A method comprising:
storing a current-address value;
storing input-pattern-address-selection data in a state array;
outputting input-pattern-address-selection data from a location in the state array addressed by the current-address value;
holding data based on an input pattern in an input-pattern array;
outputting input-pattern data from a location in the input-pattern array addressed by the input-pattern-address-selection data from the state array;
generating a next-address value based on the current-address value and the input-pattern data, and changing the current-address value to equal the next-address value, wherein a respective path is defined by a set of address values generated based on a respective set of input-pattern data;
generating at least one respective hash having a plurality of bits, wherein each respective one of the plurality of bits is associated with a set of a predetermined set of addresses, and wherein a value of each of the plurality of bits of the respective hash is determined by whether the path includes at least one of the predetermined set of addresses associated with that respective bit; and
during a recognition mode, outputting at least one pattern identifier of a recognized pattern in the input pattern based on the at least one respective hash.

12. The method of claim 11, further comprising:
during a training mode, loading a pattern-recognition table with a plurality of pattern identifiers corresponding to known patterns, wherein the loading includes loading each pattern identifier into one or more address locations, each address location corresponding to a training hash, wherein the training hash is generated based on one of a plurality of training patterns,
wherein the plurality of training patterns includes a first training pattern, wherein a first pattern identifier is associated with the first training pattern, and wherein the loading includes:
generating a first training hash from the first training pattern,
forming a first plurality of adjacent hashes for the first training hash by altering different selected subsets of hash bits of the first training hash, each subset having one or more bits,
using each one of the first plurality of adjacent hashes as an address of a respective location in the recognition table and storing the first pattern identifier into the respective location,
wherein the generating of the at least one hash includes generating a plurality of hashes,
wherein the outputting of the at least one pattern identifier includes outputting a plurality of pattern identifiers, each one of the plurality of pattern identifiers based on a corresponding one of the plurality of hashes,
wherein the method further comprises comparing the outputted plurality of pattern identifiers and generating an indication of a recognized pattern in the input pattern based on a frequency of occurrence of each one of the plurality of pattern identifiers.

13. The method of claim 11, wherein a size of the set of the predetermined set of addresses for each bit is chosen such that a probability that the path includes at least one of the plurality of addresses associated with the bit is about 50%.

14. The method of claim 11, wherein a maximum difference between the next-address value and the current-address value is about 2A, an average step size is about A, and a size of the set of the predetermined set of addresses used for each one of the plurality of bits of the respective hash is about $\log(0.5)/\log((A-1)/A)$.

15. The method of claim 11, wherein the generating of the next-address value further comprises:
providing a plurality of next-address arrays;
using the input-pattern data from the input-pattern array to select a selected one of the plurality of next-address arrays, and using the current-address value from the current-address unit to select a selected location in the selected one of the plurality of next-address arrays, and outputting a next-address-increment value from the selected location; and
adding the next-address-increment value to the current-address value to generate the next-address value.

16. The method of claim 11, further comprising:
providing a recognition table;
wherein during a training mode:
generating a respective training hash based on each one of a plurality of training patterns, and
loading the recognition table with a plurality of pattern identifiers corresponding to known patterns, each pattern identifier being loaded into one or more address locations each corresponding to the respective training hashes, and
wherein during the recognition mode:
wherein, the outputting of the at least one pattern identifier further comprises using each of the at least one respective hash as an address location in the recognition table, and
outputting from the recognition table the pattern identifier corresponding to each one of the one or more hashes.

17. The method of claim 16, wherein the one or more address locations corresponding to each respective training hash includes a plurality of address locations corresponding to each respective training hash, wherein a first one of the plurality of training patterns is associated with a first training hash and a first pattern identifier,
wherein the loading of the recognition table further includes loading the first pattern identifier into each one of a selected plurality of selected locations of the recognition table during the training mode by altering different selected subsets of one or more bits of the first training hash, thus forming a first plurality of adjacent hashes for the first training hash, and using each of the first plurality of adjacent hashes as an address of a location in the recognition table in which to store the first pattern identifier.

18. The method of claim 11, wherein the generating of the at least one respective hash includes generating a plurality of respective hashes, and wherein the outputting of the at least one pattern identifier includes outputting a plurality of pattern identifiers including a respective pattern identifier of a recognized pattern in the input pattern based on each respective hash of the plurality of respective hashes.

19. The method of claim 18, further comprising generating a count of each different identifier among the plurality of pattern identifiers and outputting an indication of a recognized pattern in the input pattern based on a frequency of occurrence of each one of the plurality of pattern identifiers.

20. The method of claim 11, wherein a maximum difference between the next-address value and the current-address value is about 256, and the set of addresses used for each respective bit of the respective hash is 88 addresses.

21. An apparatus comprising:
means for storing a current-address value;
means for storing input-pattern-address-selection data in a state array;
means for outputting input-pattern-address-selection data from a location in the state array addressed by the current-address value;
means for holding data based on an input pattern in an input-pattern array;
means for outputting input-pattern data from a location in the input-pattern array addressed by the input-pattern-address-selection data from the state array;
means for generating a next-address value based on the current-address value and the input-pattern data, and changing the current-address value to equal the next-address value, wherein a respective path is defined by a set of address values generated based on a respective set of input-pattern data;
means for generating at least one respective hash having a plurality of bits, wherein each respective one of the plurality of bits is associated with a set of a predetermined set of addresses, and wherein a value of each of the plurality of bits of the respective hash is determined by whether the path includes at least one of the predetermined set of addresses associated with that respective bit; and
means for, during a recognition mode, outputting at least one pattern identifier of a recognized pattern in the input pattern based on the at least one respective hash.

22. The apparatus of claim 21, further comprising:
means for, during a training mode, loading a pattern-recognition table with a plurality of pattern identifiers corresponding to known patterns, wherein the loading includes loading each pattern identifier into one or more address locations, each address location corresponding to a training hash, wherein the training hash is generated based on one of a plurality of training patterns,
wherein the plurality of training patterns includes a first training pattern, wherein a first pattern identifier is associated with the first training pattern, and wherein the means for loading includes:
means for generating a first training hash from the first training pattern,
means for forming a first plurality of adjacent hashes for the first training hash by altering different selected subsets of hash bits of the first training hash, each subset having one or more bits,
means for using each one of the first plurality of adjacent hashes as an address of a respective location in the recognition table and storing the first pattern identifier into the respective location,
wherein the means for generating of the at least one hash includes means for generating a plurality of hashes,
wherein the means for outputting of the at least one pattern identifier includes means for outputting a plurality of pattern identifiers, each one of the plurality of pattern identifiers based on a corresponding one of the plurality of hashes,
wherein the apparatus further comprises means for comparing the outputted plurality of pattern identifiers and means for generating an indication of a recognized pattern in the input pattern based on a frequency of occurrence of each one of the plurality of pattern identifiers.

* * * * *